(12) United States Patent
Fox et al.

(10) Patent No.: US 8,875,090 B2
(45) Date of Patent: *Oct. 28, 2014

(54) METHOD AND SYSTEM FOR MONITORING METADATA RELATED TO SOFTWARE ARTIFACTS

(71) Applicant: Sonatype, Inc., Silver Spring, MD (US)

(72) Inventors: Brian Edward Fox, Goffstown, NH (US); Joel Orlina, Silver Spring, MD (US)

(73) Assignee: Sonatype, Inc., Fulton, MD (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/861,065

(22) Filed: Apr. 11, 2013

(65) Prior Publication Data

US 2013/0227517 A1 Aug. 29, 2013

Related U.S. Application Data

(63) Continuation of application No. 13/483,412, filed on May 30, 2012, now Pat. No. 8,473,894, and a continuation-in-part of application No. 13/231,162, filed on Sep. 13, 2011, now Pat. No. 8,627,270.

(51) Int. Cl.
*G06F 9/44* (2006.01)
*G06F 11/30* (2006.01)
*G06F 21/00* (2013.01)

(52) U.S. Cl.
CPC .............. *G06F 8/70* (2013.01); *G06F 11/3072* (2013.01); *G06F 9/44* (2013.01); *G06F 21/00* (2013.01); *G06F 11/3003* (2013.01); *G06F 2201/865* (2013.01); *G06F 8/71* (2013.01)
USPC .......................................... 717/101; 717/121

(58) Field of Classification Search
None
See application file for complete search history.

(56) References Cited

U.S. PATENT DOCUMENTS

| 5,615,400 | A | 3/1997 | Cowsar et al. |
| 6,167,535 | A | 12/2000 | Foote et al. |
| 6,282,698 | B1 | 8/2001 | Baker et al. |
| 6,931,544 | B1 | 8/2005 | Kienhofer et al. |
| 7,080,355 | B2 | 7/2006 | Carlson et al. |
| 7,149,734 | B2 | 12/2006 | Carlson et al. |

(Continued)

OTHER PUBLICATIONS

Froehlich et al., "Unifying Artifacts and Activities in a Visual Tool for Distributed Software Development Teams," 2004, Proceedings of the 26th International Conference on Software Engineering, pp. 387-396.*

(Continued)

*Primary Examiner* — Thuy Dao
*Assistant Examiner* — Stephen Berman
(74) *Attorney, Agent, or Firm* — Posz Law Group, PLC

(57) ABSTRACT

Collecting and storing an artifact identifier for one or more artifacts, project identifiers for one or more software projects that use each artifact, and information about the temporal version for the artifacts. Collecting and storing project information related to the software projects, including a project identifier for each project, and contact information for a user of each software project. Collecting Metadata associated with the software artifacts, which includes information identifying the artifact, information about security risks associated with the artifact, information about a license associated with the artifact, or information indicative of a level of use or user rating of the artifact. The metadata is periodically or continually monitored to determine whether there has been any actionable change, and notifying the user about the actionable change.

21 Claims, 8 Drawing Sheets

(56) References Cited

U.S. PATENT DOCUMENTS

| | | | |
|---|---|---|---|
| 7,159,206 B1 | 1/2007 | Sadhu et al. | |
| 7,234,131 B1* | 6/2007 | Speyrer et al. | 717/101 |
| 7,322,024 B2 | 1/2008 | Carlson et al. | |
| 7,343,386 B2 | 3/2008 | Gomes et al. | |
| 7,506,312 B1 | 3/2009 | Girolami-Rose et al. | |
| 7,644,101 B2 | 1/2010 | Yano | |
| 7,707,162 B2 | 4/2010 | Naphade et al. | |
| 7,735,068 B2 | 6/2010 | Siddarampappa et al. | |
| 7,788,632 B2 | 8/2010 | Kuester et al. | |
| 7,810,087 B2 | 10/2010 | O'Brien | |
| 7,814,078 B1 | 10/2010 | Forman et al. | |
| 7,844,592 B2 | 11/2010 | Shoval et al. | |
| 7,877,391 B2 | 1/2011 | Bird et al. | |
| 7,958,494 B2* | 6/2011 | Chaar et al. | 717/121 |
| 8,060,871 B2 | 11/2011 | Bernabeu-Auban et al. | |
| 8,069,182 B2 | 11/2011 | Pieper | |
| 8,104,018 B2 | 1/2012 | Chessell et al. | |
| 8,156,092 B2 | 4/2012 | Hewett et al. | |
| 8,156,120 B2 | 4/2012 | Brady | |
| 8,161,470 B2 | 4/2012 | Bottomley et al. | |
| 8,280,755 B2 | 10/2012 | Stuhec et al. | |
| 8,296,251 B1 | 10/2012 | Athayde | |
| 8,327,318 B2* | 12/2012 | Chaar et al. | 717/102 |
| 8,356,278 B2 | 1/2013 | Drissi et al. | |
| 8,359,285 B1 | 1/2013 | Dicker et al. | |
| 8,359,566 B2* | 1/2013 | Chaar et al. | 717/101 |
| 8,359,571 B2* | 1/2013 | Clemm et al. | 717/120 |
| 8,438,532 B2 | 5/2013 | Fox et al. | |
| 8,464,205 B2 | 6/2013 | Chaar et al. | |
| 8,473,894 B2 | 6/2013 | Fox et al. | |
| 8,479,159 B2 | 7/2013 | Klinger et al. | |
| 8,479,165 B1 | 7/2013 | Kawashima et al. | |
| 8,484,617 B2* | 7/2013 | Goh et al. | 717/121 |
| 8,499,284 B2 | 7/2013 | Pich et al. | |
| 8,539,437 B2* | 9/2013 | Finlayson et al. | 717/101 |
| 8,543,979 B2 | 9/2013 | Arcese et al. | |
| 8,572,550 B2 | 10/2013 | Fox et al. | |
| 8,612,936 B2 | 12/2013 | Fox et al. | |
| 8,627,270 B2 | 1/2014 | Fox et al. | |
| 8,656,343 B2 | 2/2014 | Fox et al. | |
| 8,745,572 B2* | 6/2014 | Zimmermann et al. | 717/101 |
| 2003/0046282 A1 | 3/2003 | Carlson et al. | |
| 2004/0010786 A1 | 1/2004 | Cool et al. | |
| 2004/0039921 A1 | 2/2004 | Chuang | |
| 2004/0046785 A1 | 3/2004 | Keller | |
| 2004/0243968 A1 | 12/2004 | Hecksel | |
| 2005/0086473 A1 | 4/2005 | Barkley et al. | |
| 2005/0137884 A1 | 6/2005 | Baird | |
| 2005/0289066 A1 | 12/2005 | Weare | |
| 2006/0020937 A1 | 1/2006 | Schaefer | |
| 2006/0037000 A1 | 2/2006 | Speeter et al. | |
| 2006/0048097 A1 | 3/2006 | Doshi | |
| 2006/0149717 A1 | 7/2006 | Bird et al. | |
| 2006/0265688 A1 | 11/2006 | Carlson et al. | |
| 2007/0033567 A1 | 2/2007 | Carlson et al. | |
| 2007/0050232 A1 | 3/2007 | Chang et al. | |
| 2007/0089086 A1 | 4/2007 | Ortloff | |
| 2007/0143735 A1 | 6/2007 | Clemm et al. | |
| 2007/0250829 A1 | 10/2007 | Hillier et al. | |
| 2007/0277148 A1 | 11/2007 | Venolia | |
| 2008/0028378 A1 | 1/2008 | Biswas et al. | |
| 2008/0127040 A1 | 5/2008 | Barcellona | |
| 2008/0154965 A1 | 6/2008 | Pedersen | |
| 2008/0229300 A1 | 9/2008 | O'Brien | |
| 2008/0235680 A1* | 9/2008 | Strauss et al. | 717/178 |
| 2008/0263505 A1 | 10/2008 | StClair et al. | |
| 2008/0270374 A1 | 10/2008 | Li et al. | |
| 2008/0281904 A1 | 11/2008 | Conrad et al. | |
| 2008/0307267 A1 | 12/2008 | Chandrasekaran | |
| 2008/0313595 A1 | 12/2008 | Boulineau et al. | |
| 2009/0013310 A1 | 1/2009 | Arner et al. | |
| 2009/0055809 A1 | 2/2009 | Campbell | |
| 2009/0064114 A1 | 3/2009 | Bottomley et al. | |
| 2009/0094572 A1 | 4/2009 | Hegde et al. | |
| 2009/0119261 A1 | 5/2009 | Ismalon | |
| 2009/0138843 A1 | 5/2009 | Hinton et al. | |
| 2009/0144698 A1 | 6/2009 | Fanning et al. | |
| 2009/0300404 A1 | 12/2009 | Branson et al. | |
| 2009/0307662 A1 | 12/2009 | Ackerman | |
| 2010/0023919 A1 | 1/2010 | Chaar et al. | |
| 2010/0023920 A1 | 1/2010 | Chaar et al. | |
| 2010/0058295 A1 | 3/2010 | Johnson et al. | |
| 2010/0100543 A1 | 4/2010 | Brady | |
| 2010/0153920 A1 | 6/2010 | Bonnet | |
| 2010/0211924 A1 | 8/2010 | Begel et al. | |
| 2010/0306730 A9 | 12/2010 | Carlson et al. | |
| 2010/0333067 A1 | 12/2010 | Goh et al. | |
| 2011/0010685 A1* | 1/2011 | Sureka et al. | 717/102 |
| 2011/0023016 A1 | 1/2011 | Khader et al. | |
| 2011/0055186 A1 | 3/2011 | Gopalakrishnan | |
| 2011/0066619 A1 | 3/2011 | Perantatos et al. | |
| 2011/0107301 A1 | 5/2011 | Chan et al. | |
| 2011/0137807 A1 | 6/2011 | Cha | |
| 2011/0145810 A1 | 6/2011 | Forsyth | |
| 2011/0258162 A1 | 10/2011 | Lam | |
| 2011/0289098 A1 | 11/2011 | Oztaskent et al. | |
| 2011/0307862 A1 | 12/2011 | Abrams et al. | |
| 2011/0314438 A1 | 12/2011 | Surazski et al. | |
| 2012/0060148 A1 | 3/2012 | Jones et al. | |
| 2012/0110039 A1 | 5/2012 | McKay et al. | |
| 2012/0124547 A1 | 5/2012 | Halbedel | |
| 2012/0144363 A1* | 6/2012 | Bernardini et al. | 717/101 |
| 2012/0159420 A1 | 6/2012 | Yassin et al. | |
| 2012/0246616 A1 | 9/2012 | Frontiero et al. | |
| 2012/0272205 A1 | 10/2012 | Fox et al. | |
| 2012/0311534 A1 | 12/2012 | Fox et al. | |
| 2012/0317546 A1 | 12/2012 | Arcese et al. | |
| 2012/0324419 A1 | 12/2012 | Roberts et al. | |
| 2012/0331439 A1 | 12/2012 | Zimmermann et al. | |
| 2012/0331447 A1 | 12/2012 | Nayak et al. | |
| 2013/0007704 A1 | 1/2013 | Haynes et al. | |
| 2013/0047137 A1 | 2/2013 | Bak et al. | |
| 2013/0067426 A1 | 3/2013 | Fox et al. | |
| 2013/0067427 A1 | 3/2013 | Fox et al. | |
| 2013/0074038 A1 | 3/2013 | Fox et al. | |
| 2013/0191808 A1 | 7/2013 | Fox et al. | |
| 2013/0212562 A1 | 8/2013 | Fox et al. | |
| 2013/0227517 A1 | 8/2013 | Fox et al. | |
| 2013/0311496 A1 | 11/2013 | Fedorenko et al. | |
| 2013/0326469 A1 | 12/2013 | Fox et al. | |
| 2014/0026121 A1 | 1/2014 | Jackson | |
| 2014/0075414 A1 | 3/2014 | Fox et al. | |

OTHER PUBLICATIONS

Grundy et al., "Inconsistency management for multiple-view software development environments," 1998, IEEE Transactions on Software Engineering, vol. 24, Issue: 11, pp. 960-981.*

Han, "Supporting impact analysis and change propagation in software engineering environments," 1997, Proceedings Eighth IEEE International Workshop on Software Technology and Engineering Practice incorporating Computer Aided Software Engineering, pp. 172-182.*

U.S. Appl. No. 13/369,617, filed Feb. 9, 2012, Fox et al.

U.S. Appl. No. 13/476,160, filed May 21, 2012, Fedorenko et al.

U.S. Appl. No. 13/544,335, filed Jul. 20, 2012, Jackson et al.

U.S. Appl. No. 13/744,542, filed Jan. 18, 2013, Fox et al.

U.S. Appl. No. 13/780,525, filed Feb. 28, 2013, Fox et al.

Sourceforge, List of Current OSS Discovery Fingerprints [online] [retrieved on May 27, 2012] Retrieved from the internet: <http://ossdiscovery.sourceforge.net/fingerprints.html>.

Sourceforge, OSS Discovery FAQ [online] [retrieved on May 27, 2012] Retrieved from the internet: <http://ossdiscovery.sourceforge.net/faq.html>.

Cubranic et al., "Hipikat: Recommending Pertinent Software Development Artifacts," 2003, Proceedings of the 25th International Conference on Software Engineering (ICSE '03), pp. 1-11.

Cubranic et al., "Hipikat: A Project Memory for Software Development," IEEE Transactions on Software Engineering, vol. 31, No. 6, Jun. 2005, pp. 446-465.

Milanovic et al., "Model & Metamodel, Metadata and Document Repository for Software and Data Integration", 2008, MoDELS 2008, LNCS 5301, pp. 416-430, 2008.

(56) References Cited

OTHER PUBLICATIONS

Sherman, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.
Ji et al., "Efficient Interactive Fuzzy Keyword Search", WWW 2009, Apr. 20-24, 2009, ACM 978-1-60558-487-Apr. 9, 2004, pp. 371-380.
Happel et al., Potentials and Challenges of Recommendation Systems for Software Development, RSSE '08, Copyright 2008 ACM 978-1-60558-228-3, pp. 11-15.
Maalej et al., "A Lightweight Approach for Knowledge Sharing in Distributed Software Teams", T. Yamaguchi (Ed.): PAKM 2008, LNAI 5345, pp. 14-25.
Gardler, "Reuse Readiness Rating", 2009, pp. 1-17, downloaded from the Internet on Apr. 1, 2013 from <url>:http://www.oss-watch.ac.uk/resources/reuseReadinessRating.
Open Source Initiative, "Home", May 5, 2010, pp. 1-2, downloaded from the Waybackmachine Internet Archive on Apr. 1, 2013.
Notice of Allowance issued by the U.S. Patent Office on Jan. 22, 2013 in connection with related U.S. Appl. No. 13/089,751.
Notice of Allowance issued by the U.S. Patent Office on Mar. 15, 2013 in connection with related U.S. Appl. No. 13/483,412.
Office Action issued by the U.S. Patent Office on Apr. 8, 2013 in connection with related U.S. Appl. No. 13/151,816.
Office Action issued by the U.S. Patent Office on Apr. 9, 2013 in connection with related U.S. Appl. No. 13/231,162.
Office Action issued by the U.S. Patent Office on Sep. 24, 2013 in connection with related U.S. Appl. No. 13/476,160.
Office Action issued by the U.S. Patent Office on Oct. 2, 2013 in connection with related U.S. Appl. No. 13/554,335.
Google, 'classpath-explorer Library which allows discovering classes at runtime, 2008. p. 1, downloaded from the Wayback Machine Internet Archive Sep. 25, 2013.
Cook et al., "An Extensible Framework for Collaborative Software Engineering", 2003, Proceedings of the Tenth Asia-Pacific Software Engineering Conference (APSEC'03), pp. 1-10.
Fitzpatrick et al., "CVS Integration with Notification and Chat: Lightweight Software Team Collaboration," CSCW'06, Nov. 4-8, 2006. pp. 49-58.
Cleland-Huang et al., "Event-Based Traceability for Managing Evolutionary Change," IEEE Transactions on Software Engineering, vol. 29, No. 9, Sep. 2003, pp. 796-810.
Notice of Allowance issued by the U.S. Patent Office on Oct. 4, 2013 in related U.S. Appl. No. 13/369,617.
The International Search Report and the Written Opinion of the International Searching Authority mailed on Oct. 15, 2013 by the International Searching Authority in connection with international application No. PCT/US2013/041785, which corresponds to related U.S. Appl. No. 13/476,160.
Dmitriev. Safe Class and Data Evolution in Large and Long-Lived Java Applications. Mar. 2001. [retrieved on 2013-26] Retrieved from the Internet: <URL:http://citeseerx.ist.psu.edu/viewdoc/download-?doi+10.1.1.6.1812&rep+repl&type=pdf>, entire document.
Chilowicz et al. Syntax tree fingerprinting: a foundation for source code similarity detection. Sep. 29, 2011. [Retrieved on 2013-26]. Retrieved from the Internet: <URL: http://hal-upec-mlv.archives-ouvertest.fr/docs/00/62/78/11/PDF/HAL.pdf>,entire document.
U.S. Appl. No. 13/962,122, filed Aug. 8, 2013, Fox et al.
Gacek, "Exploiting Domain Architectures in Software Reuse", 1992, ACM 0-89791-739- 1/95/0004, pp. 229-232.
Prieto-Diaz et al., "Classifying Software for Reusability", Jan. 1987, IEEE Software pp. 6-16.
Meling et al., "Storing and Retrieving Software Components: A Component Description Manager", 2000, IEE, pp. 1-11.
Robillard et al., "Recommendation Systems for Software Engineering", IEEE Computer Society, 2010, pp. 80-86.
Duan et al., "Clustering Support for Automated Tracing", ASE '07, Nov. 5-9, 2007, pp. 244-253.
David, "Recommending Software Artifacts from Repository Transactions", IEA/AIE '08 Proceedings of the $21^{st}$ International conference on Industrial, Engineering and Other Applications of Applied Intelligent Systems: New Frontiers in Applied Artificial Intelligence, 2008, pp. 189-198.
Herbsleb, "Global Software Engineering: The Future of Socio-technical Coordination," 2007, FOSE '07 2007 Future of Software Engineering, pp. 188-198.
Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.
Office Action issued by the U.S. Patent Office on Jun. 18, 2013 in related U.S. Appl. No. 13/369,617.
Notice of Allowance issued by the U.S. Patent Office on Jul. 11, 2013 in related U.S. Appl. No. 13/780,525.
Notice of Allowance issued by the U.S. Patent Office on Aug. 14, 2013 in related U.S. Appl. No. 13/151,816.
Notice of Allowance issued by the U.S. Patent Office on Sep. 9, 2013 in related U.S. Appl. No. 13/231,162.
U.S. Appl. No. 14/140,167, filed Dec. 24, 2013, Fox et al.
Final Office Action issued by the U.S. Patent Office on Feb. 25, 2014 in connection with related U.S. Appl. No. 13/554,335.
Office Action issued by the U.S. Patent Office on Mar. 10, 2014 in connection with related U.S. Appl. No. 13/233,265.
Notice of Allowance issued by the U.S. Patent Office on Mar. 20, 2014 in related U.S. Appl. No. 13/476,160.
Gall et al., "Visualizing software release histories: the use of color and third dimension," IEEE International Conference on Software Maintenance, 1999 (ICSM '99) Proceedings, pp. 99-108.
Siobhan Clark et al., "Verifying components under development at the design stage: A Tool to support the composition of component design models", 1998, Google, 3 pages.
Mili et al., "Storing and Retrieving Software Components: A Refinement Based System", 1994, IEEE, 91-100.

* cited by examiner

METHOD AND SYSTEM FOR MONITORING METADATA RELATED TO SOFTWARE ARTIFACTS

RELATED APPLICATIONS

This application is a continuation of U.S. patent application Ser. No. 13/483,412, filed 30 May 2012, titled "METHOD AND SYSTEM FOR MONITORING METADATA RELATED TO SOFTWARE ARTIFACTS", and is a continuation-in-part of U.S. patent application Ser. No. 13/231,162, filed 13 Sep. 2011, and titled "METHOD AND SYSTEM FOR MONITORING A SOFTWARE ARTIFACT, the contents of which are hereby incorporated by reference in their entirety.

TECHNICAL FIELD

The technical field relates in general to software development, and more specifically to providing information about software artifacts used in software development.

BACKGROUND

All software developers, in whatever language and platform, whatever methodology, will realize that there is some software that they don't want to write and that already exists. However, there may be multiple artifacts that already exist and possibly do what the programmer needs to do. Developers that write their own software conventionally will use published artifacts as building blocks in writing code within a larger project, so as to avoid re-writing software which already exists.

Complicating the problem of using existing artifacts is the fact that issues can arise with these artifacts over time (e.g., security defects, license changes, potential infringement of intellectual property) that a user might wish to address, and the existing artifact might change during the course of the development of a piece of software and after the piece of software has been developed and released (e.g., the introduction of a new version of the artifact).

SUMMARY

Accordingly, one or more embodiments provide a computer system. The computer system includes a transceiver operable to transmit and receive communications over at least a portion of a network; and a processor cooperatively operable with the transceiver, and configured to facilitate: collecting and storing artifact information related to one or more software artifacts, the artifact information including: an artifact identifier for each of the one or more artifacts, project identifiers for any of one or more software projects that use each of the one or more artifacts, information about the temporal version for the one or more artifacts; collecting and storing project information related to the one or more software projects that use the one or more software artifacts, the project information including: a project identifier for each of the one or more projects, and contact information for a user of the software project; collecting, from a software repository by communication over the transceiver, metadata associated with the one or more software artifacts, the metadata for each of the one or more software artifacts including: information identifying the respective artifact, information about security risks associated with the respective artifact, information about a license associated with the respective artifact, or information indicative of a level of use or user rating of the respective artifact; periodically or continually monitoring the metadata to determine whether there has been any actionable change in the metadata associated with the one or more software artifacts; and notifying the user of any software project that uses a software artifact for which there has been an actionable change about the actionable change, the notifying operation being performed via the transceiver using the contact information.

In a further embodiment, the information relating to the one or more respective artifacts further includes: a group identifier uniquely identifying a publisher of the respective artifact, and a version number uniquely indicating a temporal version of the respective artifact, and the artifact identifier uniquely identifies the respective artifact within the publisher.

In a different embodiment, the information relating to the one or more respective artifacts further includes: a coordinate system identifier that identifies a coordinate system used, and information identifying the respective artifact using the coordinate system.

In a still different embodiment, the coordinate system is one of: a Maven coordinate system, a P2 coordinate system, an OSGi coordinate system, a RubyGems coordinate system, or a NuGet coordinate system.

In another embodiment, the information indicative of a level of use or user rating of the respective artifact includes at least one of: user-provided ranking information specific to the respective artifact obtained from a community of users to which the user belongs, or an indication of a number of users with the community who are also using the respective artifact, and the community of users to which the user belongs is determined by a profile of the user or the user project to which the user belongs as indicated by the profile of the user.

In yet another embodiment, the processor is further configured to facilitate interacting with a user to collect human-provided metadata including the information indicative of a level of use or user rating of the respective artifact community.

In a still further embodiment, the artifact is stored in the software repository according to the Open Source Definition, the software repository being an open source repository.

In a further embodiment, the metadata is periodically monitored for actionable changes, and the processor further comprises a calendar database configured to determine when to periodically monitor the metadata to determine whether there has been any actionable change in the metadata associated with the one or more software artifacts.

In a yet another embodiment, the project information includes evaluation criteria for each of the one or more software artifacts used by the project identifier for each of the one or more projects, the project evaluation criteria identifying what makes a change in the metadata actionable, the metadata is continually monitored for actionable changes, and the continual monitoring includes detecting a change in the metadata associated with the one or more software artifacts, and determining whether the change in the metadata is actionable for a respective software project based on the evaluation criteria in a respective set of project information.

In a still further embodiment, the metadata is monitored for an actionable change every time any piece of metadata is changed.

One or more further embodiments provide a computer-implemented method for monitoring a software project that includes one or more software artifacts for a user. The method includes: collecting and storing artifact information related to one or more software artifacts, the artifact information including: an artifact identifier for each of the one or more artifacts, project identifiers for any of one or more software projects that use each of the one or more artifacts, information about the temporal version for the one or more artifacts; collecting and storing project information related to the one or more software projects that use the one or more software artifacts, the project information including: a project identifier for each of the one or more projects, and contact information for a user of the software project; collecting, from a software repository by communication over the transceiver, metadata associated with the one or more software artifacts, the metadata for each of the one or more software artifacts including: information identifying the respective artifact, information about security risks associated with the respective artifact, information about a license associated with the respective artifact, or information indicative of a level of use or user rating of the respective artifact; periodically or continually monitoring the metadata to determine whether there has been any actionable change in the metadata associated with the one or more software artifacts; and notifying the user of any software project that uses a software artifact for which there has been an actionable change about the actionable change, the notifying operation being performed via the transceiver using the contact information.

In a further embodiment, the information identifying the respective artifact includes: a group identifier uniquely identifying a publisher of the respective artifact, and a version number uniquely indicating a temporal version of the respective artifact; and the artifact identifier uniquely identifies the respective artifact within the publisher.

In another embodiment, the information regarding a level of use or user rating of the respective artifact includes at least one of: user-provided ranking information specific to the respective artifact obtained from a community of users to which the user belongs, or an indication of a number of users with the community who are also using the respective artifact; and the community of users to which the user belongs is determined by a profile of the user or the user project to which the user belongs as indicated by the profile of the user.

In yet another embodiment, the method further includes interacting with a user to collect human-provided artifact metadata including the information indicative of a level of use or user rating of the respective artifact community.

In a still further embodiment, the artifact is stored in the software repository according to the Open Source Definition, the software repository being an open source repository.

In yet another embodiment, the project information includes evaluation criteria for each of the one or more software artifacts used by each of the one or more projects, the project evaluation criteria identifying what makes a change in the metadata actionable, the metadata is continually monitored for actionable changes, and the continual monitoring includes: detecting a change in the metadata associated with the one or more software artifacts, and determining whether the change in the metadata is actionable for a respective software project based on the evaluation criteria in a respective set of project information.

In a still further embodiment, the metadata is monitored for an actionable change every time any piece of metadata is changed.

One or more still further embodiments provide a non-transitory computer-readable medium including instructions for execution by a computer, the instructions including a computer-implemented method for providing a method for monitoring a software project, the instructions for implementing: collecting and storing artifact information related to one or more software artifacts, the artifact information including: an artifact identifier for each of the one or more artifacts, project identifiers for any of one or more software projects that use each of the one or more artifacts, information about the temporal version for the one or more artifacts; collecting and storing project information related to the one or more software projects that use the one or more software artifacts, the project information including: a project identifier for each of the one or more projects, and contact information for a user of the software project; collecting, from a software repository by communication over the transceiver, metadata associated with the one or more software artifacts, the metadata for each of the one or more software artifacts including: information identifying the respective artifact, information about security risks associated with the respective artifact, information about a license associated with the respective artifact, or information indicative of a level of use or user rating of the respective artifact; periodically or continually monitoring the metadata to determine whether there has been any actionable change in the metadata associated with the one or more software artifacts; and notifying the user of any software project that uses a software artifact for which there has been an actionable change about the actionable change, the notifying operation being performed via the transceiver using the contact information.

In a further embodiment, the information identifying the respective artifact includes: a group identifier uniquely identifying a publisher of the respective artifact, an artifact identifier uniquely identifying the respective artifact within the publisher, and a version number uniquely indicating a temporal version of the respective artifact.

In another embodiment, the information regarding a level of use or user rating of the respective artifact includes at least one of: user-provided ranking information specific to the respective artifact obtained from a community of users to which the user belongs, or an indication of a number of users with the community who are also using the respective artifact; and the community of users to which the user belongs is determined by a profile of the user or the user project to which the user belongs as indicated by the profile of the user.

In yet another embodiment, the instructions are for further implementing: interacting with a user to collect human-provided artifact metadata including the information indicative of a level of use or user rating of the respective artifact community.

In still a further embodiment, the artifact is stored in the software repository according to the Open Source Definition, the software repository being an open source repository.

In a yet further embodiment, the project information includes a evaluation criteria for each of the one or more software artifacts used by the project identifier for the each of the one or more projects, and contact information for a user of the software project, the project evaluation criteria identifying what makes a change in the metadata actionable, the metadata is continually monitored for actionable changes, and the instructions are for further implementing: detecting a change in the metadata associated with the one or more software artifacts, and determining whether the change in the metadata is actionable for a respective software project based on the evaluation criteria in a respective set of project information.

In still another embodiment, the instructions implement monitoring metadata for an actionable change every time any piece of metadata is changed.

Moreover, the purpose of the foregoing summary is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
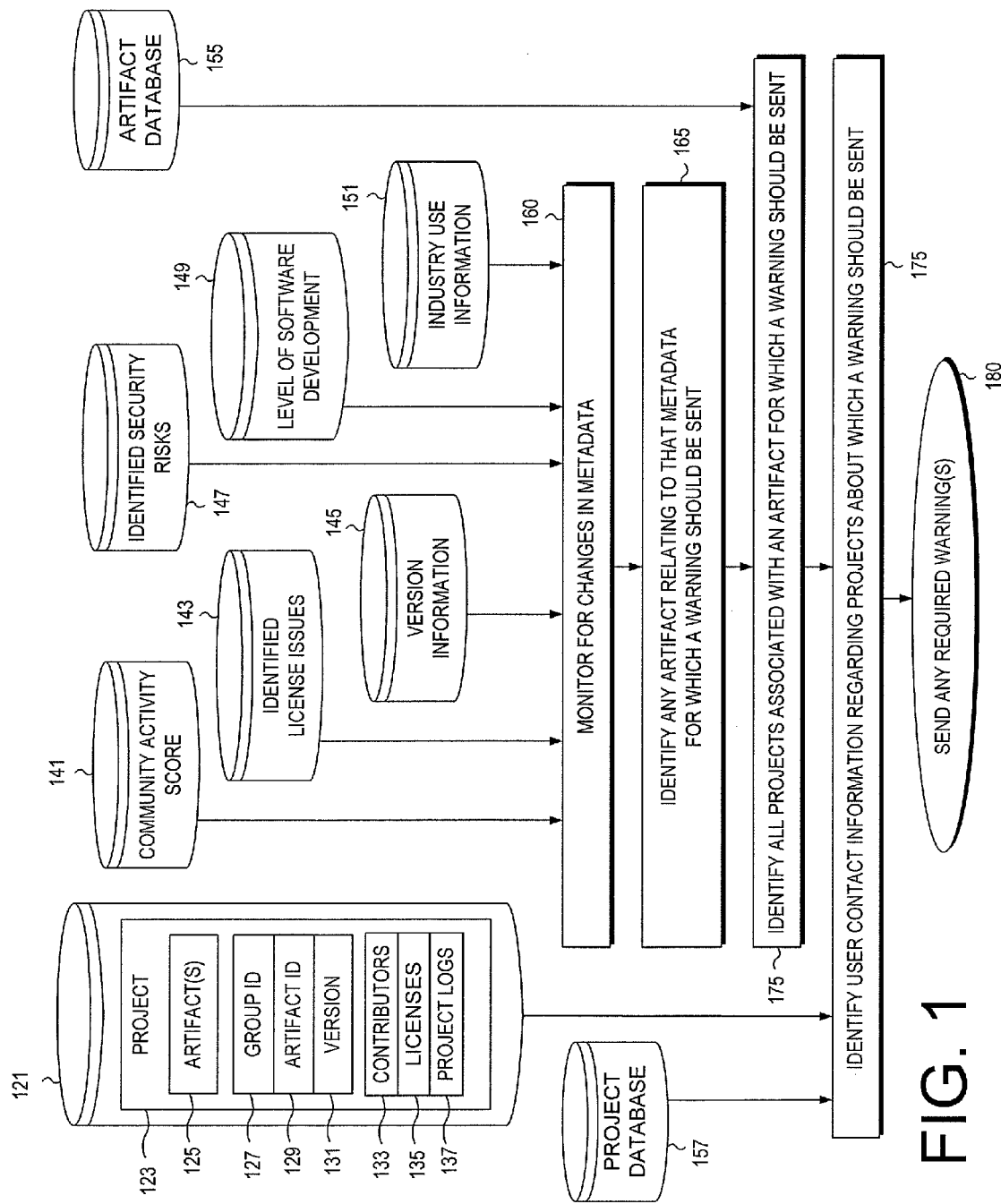
FIG. 1 is a data flow diagram illustrating monitoring a software artifact for whether warnings need to be sent about actionable changes in metadata.

In overview, the present disclosure concerns software development, in which software code building blocks, sometimes referred to as binary or source code, have been published after a formal process of vetting and then being released for use as one of plural building blocks to be used in a complete piece of software. Such software development can utilize build management tools, for example that assist in controlling the software artifacts that are selected and/or are used in a project. More particularly, various inventive concepts and principles are embodied in systems, devices, and methods therein for providing information about the appropriateness of a software artifact for its intended use in a particular software development project.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

DEFINITIONS

The claims use the following terms which are defined to have the following meanings for the purpose of the claims herein.

The term "artifact" or "software artifact" or "software build artifact" used herein is defined to be a specific version of an existing reusable software code building block, which is binary or source code, that has been published, for example as referred to in the open source model, to a publicly available repository, such that it was vetted, approved, indexed so it can be located, and formally released to the public, but is not a complete stand-alone finished product. The term "artifact", "software artifact" or "software build artifact" is not used herein in the broad sense. A concrete example of an artifact is something like, e.g., Hibernate_3, which is an object-relational mapper which allows the JAVA developer to interact with relational database as if using native object oriented code. Its Group ID is org.hibernate, its artifact ID is artifact-core, its version is 3.0. Less formally, the artifact can be understood to be a bit of code which a developer does not wish to write himself/herself and so the developer uses an artifact which is published in a repository. In the MAVEN world, for example, there is a known pre-defined process for publishing an artifact to the MAVEN central web-site or other publicly available repository.

The term "computer system" or "computer" used herein denotes a device sometimes referred to as a computer, laptop, personal computer, personal digital assistant, notebook computer, personal assignment pad, server, client, mainframe computer, variations and equivalents thereof.

The term "metadata" is defined to be data that describes the content and context of a file with which it is associated. Metadata that is associated with a software artifact can indicate a project to which the artifact belongs, a security of the artifact or a license that is associated with the artifact, among other things.

"Open source" software is defined herein to be source code that allows distribution as source code as well as compiled form, with a well-publicized and indexed means of obtaining the source, optionally with a license that allows modifications and derived works.

The term "Open Source Definition" is used herein to mean the Open Source Definition available from the Open Source Initiative, variations and evolutions thereof.

The term "project" is used herein to indicate a pre-defined collection of related software artifacts which a group of users maintains; a project can be uniquely identified by a group ID, optionally with artifact ID (as a project ID), optionally with version number. A project has a unique project name, a URL specific to the project, and a sponsoring organization; a project tracks its activity including logging when an artifact in the project is used or updated and the unique identity of the user that used or updated the artifact. Examples of projects include the Mozilla Foundation (sponsoring organization) which maintains the Firefox (project name) web browser, the Eclipse Foundation which maintains the M2Eclipse software, the Apache Software Foundation which maintains Maven, as well as private companies such as Sonatype that maintain their projects such as Sonatype Nexus Professional. A project can be a parent or child of another project, in which case the child can inherit group ID, version number, developers and contributors, plugin lists, report lists, plugin executions, and plugin configuration from the parent.

The term "repository" or "software repository" used herein are defined to mean an electronic storage system that stores software build artifacts and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository has a unique identifier that indicates the software developer (an individual or a group) that contributed the artifact. A repository can be remote or local.

The term "software build" used herein specifically is defined to mean a process as pre-defined in an executable build program of converting a plurality of artifacts obtained from a repository and combining the results into an executable stand-alone computer program or a software artifact for use in a further software build, including at least compiling artifacts and linking compiled artifacts and possibly binary artifacts from the repository, in a pre-determined order as defined in the build program.

The term "user" is defined herein specifically to be a software developer, a line coder, a technical architect, a development lead, or a development manager who is running a team of one or more developers, any of which are working on a software deliverable; or a C-level individual (CIO, CSO, and the like); or an individual that sets or enforces governing standards for software deliverables such as for vulnerability or licensing or artifacts. The term "user" is not used herein in the broad, common sense. The user can be management level because management can have final veto power over the software components in the software deliverable resulting from a project. Typically, but not always, an individual developer will not have the final say over which artifacts are approved.

<End of Definitions>

The inventors faced the problem of making sense of the giant jumble that is open source software, and finding a best artifact for their purposes among the giant jumble of available artifacts, and continuing to monitor the status of these artifacts over time. However, the system described herein is applicable to any field of software development where the information is available from which a source or categorization of the artifact can be derived.

Concerns of software developers in selecting artifacts can include the following questions, for example. Functionality—does an available artifact do more than the artifact I have now? Does the artifact do exactly what I need it to do? Security—will the artifact perform without being hacked? Applicability—will the artifact perform for my intended audience? Is this an artifact that is in use by my peers, i.e., other people in my industry (which suggests a higher degree of trust and applicability for the intended goal).

Furthermore, the answers to these questions may change over time. For example, an artifact that may have been considered the most appropriate artifact for addressing a particular function at the time of selection may be proven to be less effective than originally thought, or simply overshadowed by a newer artifact by the time a piece of software is completed. Similarly, an artifact might have no known security issues when it is first used, but has one or more security flaws identified over the course of time. Likewise, opinions of the artifact, and its use by peers, may decline over time indicating a lessened acceptance. Also, licensing issues may increase as time passes and more third parties assert patent rights against a given artifact.

A concrete example is open source artifacts that are primarily but not necessarily written in Java. There are hundreds of thousands of artifacts from which a developer can choose, but conventionally there is no set of guideposts to drive a user down a path of proper discovery, beyond traditional searching such as Google searches. Current techniques provide no scoring of artifacts, no ranking, and no set of key terms which are descriptive of one set of artifacts over another. Furthermore, once an artifact is chosen, there is no way of tracking that artifact to determine whether the qualities of the artifact used for the original selection have changed over time. In other words, there is no way of determining whether an artifact that was appropriate at the time it was selected remains appropriate when a piece of software goes to market, or after it has been in place in the market for a time.

Conventionally, the process of building an executable computer program from software artifacts can be managed by a build tool, which is a computer program that coordinates and controls other programs to compile and link the various files which together comprise the executable computer program, in the correct order. A build tool can include preprocessing, compilation, linking, packaging, testing, and ultimate distribution of the executable computer program. A project management tool can provide a superset of features found in a build tool, and can facilitate communication among members of a working team. Examples of build tools and project management tools are Maven available at Apache Software Foundation ("Apache"), Apache Ant available from Apache, Buildr available from Apache, Gradle available from Gradle Inc., Apache Ivy, and the like, variations and evolutions thereof. It is assumed that one of skill in this field is generally familiar with "Maven: The Complete Reference" (2010) published by Sonatype, Inc. Mountain View, Calif. which further describes some basic concepts.

As further discussed herein below, various inventive principles and combinations thereof are advantageously employed to help developers that are writing their own software find information about appropriate artifacts for that particular developer.

Further in accordance with exemplary embodiments, there is provided a method and system for scoring a software artifact based on quality, industry, community standards compliance, and/or user-defined criteria, and a method and system for monitoring the resulting scores over time. There is mechanism for machine-driven ingestion of metadata or information used to derive scores which is not human provided; a User Interface for collecting information which is human provided; and a mechanism for machine-driven monitoring of the derived scores over time. For example, metadata that is associated with the artifact about the activity of a project to which the artifact belongs can be collected, along with security associated with the artifact, or licensing associated with the artifact. The weighting of the artifact can be determined based on the collected metadata. Then, the weighted artifact (which has been weighted without regard to intended use by the user) can be compared to appropriateness with an intended use of the artifact by the user, so as to provide the score of the artifact specific to the user. A user in a different project with a different intended use can have a different score for the same artifact. The system can continue to collect metadata even after the artifact has been selected, and can periodically compare the metadata to the appropriateness with the intended use of the artifact by the user using some or all of the criteria used for the original selection. If the resulting score changes over time, the user can be informed. In the alternative, only selected critical criteria might be monitored, with a warning being sent only if these critical criteria indicate that the score would drop. In summary, a system and method to score a software artifact can be based on: quality of the artifact, industry in which it is used, and/or compliance with community or user-defined criteria for example. And the system may use some or all of these criteria to monitor the continuing effectiveness of the artifact for its intended use.

FIG. 1 is a data flow diagram illustrating monitoring a software artifact for whether warnings need to be sent about matters of concern. As shown in FIG. 1 data flows into a process to monitor 160 for changes in metadata; and data flows into a process to identify 165 any artifact relating to that metadata for which a warning should be sent or might need to be sent. Data then flows into a process to identify 175 all projects associated with an artifact for which a warning should be sent. Data then flows into a process to identify 180 user contact information regarding an artifact about which a warning should be sent. Data also flows from the identification of warnings to generate the actual warning(s) and send them to a user(s) 185.

Also illustrated in FIG. 1 are a repository 121 with a project 123, a community activity score database 141, a database of identified license issues 143, a version information database 145, a database of identified security risks 147, a level of software development database 149, an industry use information database 151, an artifact database 155, and a project database 157.

The community activity score database 141 includes information regarding community activity scores for existing artifacts. A community activity score is a score determined by a desirable method that indicates the expected effectiveness of an artifact for its intended use based on a variety of information about the project and from the community of users.

The database of identified license issues 143 includes information regarding identified license issues for existing artifacts. These can include artifacts that require a license, artifacts for which infringement is alleged and for which a license may be required in the future, or any other situation relevant to licenses.

The version information database 145 includes information about current, and possibly past, versions of various artifacts. This could be as simple as a listing of the current version numbers of the artifacts in question, or may include additional information regarding past artifact versions, such as a listing of past versions, dates that versions changed, etc.

The database of identified security risks 147 includes a list of any known security risks associated with each artifact. These could include a listing of known viruses or other malware associated with the artifacts, as well as any other known flaw that may relate to the security of the artifact.

The level of software development database 149 includes an indication of the level of development of each artifact. This can provide an indicator of how far along in a full process of development each artifact has reached at any given time.

The industry use information database 151 provides an indication of how much each artifact is actually in use in the industry. This may include an indication of the number of projects that use a given artifact, and may include further indications of which specific portions of the industry are using each artifact.

The artifact database 155 contains a plurality of artifact profiles. Each artifact profile in the artifact database 155 can store the information relating to an associated software artifact provided by interacting with the user, such as the name or unique identity (e.g., group ID, artifact ID, and version, collectively known as "GAV") or name of the artifact, and a list of potentially changeable parameters that could warrant the sending of a warning if they change (e.g., licensing issues, known security risks, community rating, etc.). The artifact database could also include information about the timing of data associated with the artifact. For example, the artifact database could include a time stamp indicating when each issue relating to the artifact was entered into the database. This would allow for later identification of what issues are 'new' with respect to a given date and time.

It should be noted, however, that artifact profile is not limited to the use of GAV information. A variety of coordinate systems can be provided for mapping out artifacts. The Maven coordinate system, using GAV information to map out the artifacts, is just one example. Alternate embodiments could use different coordinate systems, e.g., the P2 coordinate system, the Open Services Gateway initiative (OSGi) coordinate system, the RubyGems coordinate system, the NuGet coordinate system, or any other coordinate system used to identify software artifacts.

The P2 coordinate system refers to an artifact as an Installable Unit "IU" and it references the artifact using an "IArtifactKey" which includes (namespace, id, version), where 'namespace' is one of a series of well-known strings, like 'osgi.bundle' or 'org.eclipse.update.feature', id is a unique identifier, and version is a version number.

The OSGi coordinate system identifies artifacts using (bundle-symbolic-name, version). In this coordinate system, depending on the build tool, the 'bundle-symbolic-name' is typically either an artifact ID or a merge of a group ID and an artifact ID (with overlapping elements removed), and the version is a version number.

The RubyGems coordinate system identifies artifacts by name and version, where the name is an artifact identifier and the version is a version number.

The NuGet coordinate system uses (id, version, author), where id is an artifact ID, version is a version number, and author is an indication of who wrote the artifact.

Furthermore, it is possible in some embodiments to use multiple coordinate systems at once. In such a case, each artifact profile will then preferably indicate which coordinate system is being used for that particular artifact profile. For example, one artifact profile might be listed in the Maven coordinate system; another may be listed in the OSGi coordinate system, another could be listed in the NuGet coordinate system. In some embodiments it may be possible to convert between coordinate systems; in others, it may only be possible to search within a given coordinate system.

The project database 157 contains a plurality of project profiles. Each project profile in the project database 157 can store the information relating to a software project provided by interacting with the user, such as the information and method necessary to contact a user in the future (e.g., email address), the unique identity (e.g., GAV) or name of the project, the name or unique identity of the artifact(s) used by the project, and a set of evaluation criteria indicating what kinds of changes in artifact metadata should be reportable. These evaluation criteria may change with time. For example, prior to software release, a broad range of criteria may warrant reporting. However, after software release, the user may only want reports on critical issues relating to flaws in the artifact may cause a malfunction, and so the range of criteria warranting a report may be limited.

The project 123 includes one or more artifacts 125, a group identifier (ID) 127, an artifact ID 129 (acting as a project ID), a version number 131, a list of the contributors 133 of the artifacts, the associated license(s) 135 to which the artifacts in the project are subject, and project logs 137.

The artifacts 125 represent the actual artifacts or artifacts that are being used by the project 123. The group ID 127, artifact ID 129, and version number 131 indicate identifiers for each artifact in the project 123 that respectively represent a group ID for each artifact, noting which of a plurality of groups the artifact is in, a unique artifact ID for each artifact, and a version number for each artifact. The list of the contributors 133 of the artifacts indicates which developers have contributed to each artifact in the project; the associated license(s) 135 list any licenses that the artifacts in the project are subject to; and the project logs 137 can be, for example, source code controls (e.g., log in, check-in, check-out, update, etc.) and/or project issue tracking logs, as is known in the industry.

The premise of this disclosed embodiment is that a software developer wants to be able to use software modules/components (artifacts) that someone else has made publicly available, such as in one or more repositories 121 of one or more projects 123. If the artifacts are open source, they should be free of charge. The developer will determine which of the artifacts of a particular type they want to use based on information about the quality of that artifact as well as other information such as who else might be using that artifact in their same industry or similar types of industry, a level of community compliance for the artifact, a rating of the quality of the artifact, any known security flaws are associated with the artifact, a version of the artifact, and what license(s) are associated with the artifact.

As an example of "similar type of industry," consider a user who is a software developer in banking and wants to know if someone else in banking or finance uses the same module. As another example, a developer of a Fortune 1000 company wants to know whether other Fortune 1000 companies use the same module. As another example of a similar type of industry, consider that the developer in a regulated industry such as pharmaceuticals will be interested whether other developers in an industry under the same type of regulations are using the artifact. An artifact previously used by software developers of a similar industry or type of company will give the user more confidence than if the same artifact is used by an unknown start-up company or a different type of company or in a different industry.

Quality can be measured in a number of ways. One exemplary method is based on other users' feedback and/or reported bugs. Compliance with the community can reflect whether the artifact is widely used in a given same geography (e.g., Europe or Germany). Security flaws can represent known or potential dangers that the security of the artifact will be compromised. Version information can indicate the most up-to-date version of a given artifact, providing a warning of a need to upgrade to a newer version. A list of licenses associated with the artifact can identify whether it is necessary to purchase a license to use the software artifact, and if so, the parameters of the license. It could also indicate whether a patent or copyright holder is asserting rights against the artifact, whether or not that issue has been resolved In addition, a user may want to have some other set of metrics they can use to determine the score of an artifact so the user can decide whether or not they want to use that artifact. For example, a user might only desire to use artifacts that get a certain quality score level from user reviews, e.g., 3 or 4 star or better. Other metrics are also possible, as desired by the users of the artifacts.

Furthermore, since software development, implementation, and use may take place over a long period of time, the software developer will also want to have a mechanism in place to account for any changes in these criteria that take place over time for any software artifact that has been chosen for use. In particular, it will be helpful if the software developer can become aware of any criteria that cause the artifact to become less desirable for use. This will allow the developer to address any new issues raised before they become a problem. If this occurs before release, then the artifact in question could be removed prior to sale. If it occurs after release, then a correction can be made using a patch, a later version could be altered to avoid use of the artifact, etc.

For example, if the change in criteria involves a new potential security flaw, the developer can address the flaw before it becomes widely exploited. If the change in criteria is a reduced acceptance in the community, the developer can begin selection of a more appropriate artifact at an early time. If the change in criteria is a new license required for the artifact, then the developer can either obtain the license or begin a work-around to avoid the artifact prior to a lawsuit being filed. In general, advanced warning of a change in criteria will allow the developer time to address any problems before any matters reach a crisis point.

As discussed below, such a method and system can include one or both of two parts: (1) updating artifact information, such as who is using the artifact, known security issues, known licensing issues, version information, quality, etc., and (2) monitoring information of an existing artifact to determine whether a warning is needed.

In overview, metadata that the present system and method uses, of which a simplified representation is provided for example in FIG. 1, conveniently can be divided into three categories: (1) derived data, (2) community/contributed data, and (3) third party data. These are further discussed below.

Derived data is data which is collected about activity of the artifacts. Derived data can be, for example, conventional logs of which artifacts are downloaded from the project to users. These logs 137 in the projects 123 can be analyzed to determine, for example, how frequently the artifact is downloaded, to what geographic regions the artifact is downloaded (using a known technique), to what company is the artifact downloaded (by performing a known reverse DNS lookups to figure out the actual companies who are doing the downloading and from that determine their industry and size from an automatically or manually produced list or organization information). As a concrete example, project activity may be directly derived or inferred from the source code control mechanism (SCM) associated with the project as well as the issue tracking systems that may be associated with the project. Also, projects conventionally collect information on how frequently an artifact is updated (reflected in the project logs 137), who the committers are who contributed the artifact (listed in the contributors 133), and what else the committers have contributed (obtained by reviewing contributors 133 lists in other projects). As is known, typically, a committer has digitally signed the contributed artifact so that the contributors 133 information is highly reliable.

Community/contributed data can include, for example, reviews, scores, ranking, categorization, tagging. All of these are information that can be provided by users, for example, as artifact evaluations by humans about that artifact. This can be parallel to a review process provided in Amazon.com, Netflix and other web sites, and can be expanded to, e.g., "users who use artifact X tend to use artifact Y."

Third party data can be information pulled in from other sources and can be approximately matched to artifacts or information in the project about the artifacts. For example, data on artifact licenses can be obtained from a company that provides that type of information based on the licenses 135 associated with the artifacts, data on security of the artifact can be obtained from NIST logs or vulnerability information, and quality information can be obtained from the project logs themselves. Here, the third party data is represented by the publicized evaluations, e.g., CVE (common vulnerabilities and exposures information conventionally available from Mitre Corporation).

Typically there is not a one-to-one correspondence between the third party data and a particular artifact. Since the convention of project group/artifact/version is used for the convenience of programmers and is generally not known to persons that ultimately use the final software product, the third party data does not refer to the project group/artifact/version. Therefore, the identity of the artifact(s) to which the third party data actually is relevant must be resolved (manually or by developing and referring to a list) against the identity of the software indicated in the third party data. For example, if the artifact comes from project FOO, the artifact name and number must be reconciled against the logs for that artifact name and number at project FOO.

For example, the process to determine a blind weighting of a software artifact can obtain derived data about the artifact 125 from the names of contributors 133 of the artifact, license of the project, and project logs 137 which indicate how often and how recently the artifact is updated. The process can input community/contributed data, such as the artifact evaluations by humans indicating the subject evaluation of the humans. The process 101 can input third party data such as publicized evaluations, e.g., a CVE and can resolve the third party data software name and release (e.g., Microsoft 2007 1.0) to the project group/artifact/version. Optionally, the reputations of the contributor organization and author (such as determined by user reviews) can be further input into the process. This information can be collectively evaluated to provide a blind weighting, that is, a weighting that is "blind" because it is made without considering the user or the intended use. Various techniques are known for collecting rankings and evaluations, weighting the information, increasing/decreasing weightings and the like, and any desired technique can be used herein.

However, over the course of time, the various derived data, community/contributed data, and third party data can change. For example, the frequency at which an artifact is downloaded may vary up or down; reviews and ranking may be revised as new data is gathered; new licensing issues may arise as new infringement assertions are made; additional security risks may be identified; and new releases of artifacts can become available. Each of these facts might be relevant to a user of the artifact. In particular, negative changes might influence a user to use a different artifact if the change would not be disruptive, to update the artifact to a newer version, or at the very least to take additional precautions (e.g., generate patches for new security risks, obtain a license if a new license issue arose, etc.).

A user would therefore wish to know when significant parameters of the artifact changed over time. The current system achieves this result by maintaining a database of projects 123 and the artifacts 125 used in them, as well as databases of parameters that may change over time (e.g., the community activity score database 141, the database of identified license issues 143, the version information database 145, the database of identified security risks 147, the level of software development database 149, and the industry use information database 151.

The disclosed system then periodically or continuously cross-references the artifacts 125 in use by the projects 123 in the repository 121 to determine whether any parameters have changed that warrant notification of the project's user. This can be done by comparing the date of creation of an artifact 125 used in the project 123 with a current date associated with the artifact 125. Alternatively, individual dates can be associated with each element in the artifact 125 and these individual dates can be monitored to see if a newer artifact portion has been provided. The comparison process could also involve comparing a current version number with a version number stored with the artifact 125 to see if the current version of the artifact 125 is newer than the stored version of the artifact 125.

The data flows are illustrated herein by way of example to further understanding of the principles discussed here. Actual implementations can omit one or more portions of the data flows, and/or can include other data flows which are within the scope and spirit of the discussion herein.

Figure 2:
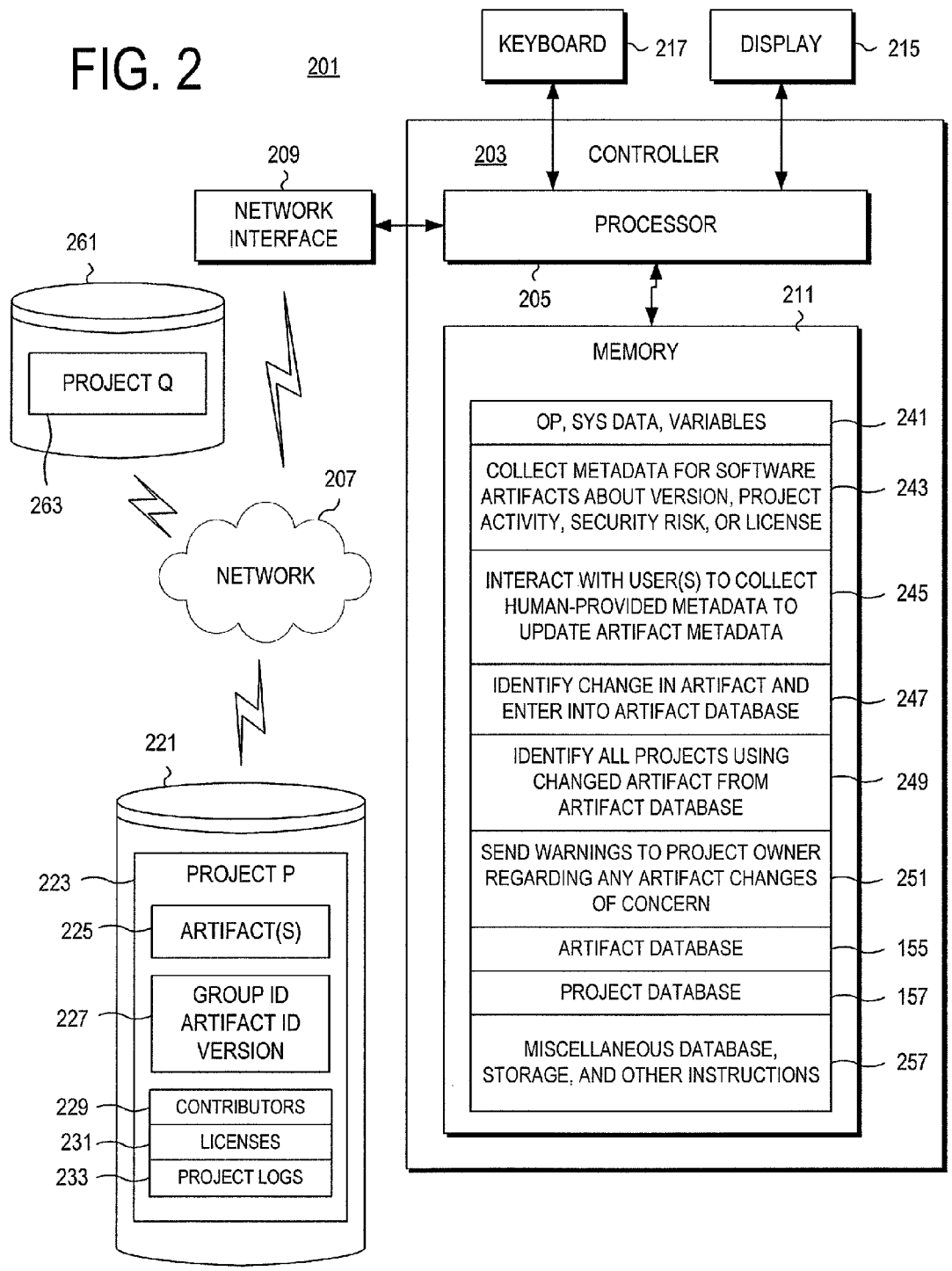
FIG. 2 is a diagram illustrating portions of a computer and a software project.

Referring now to FIG. 2, a diagram illustrating portions of a computer and a software artifact will be discussed and described. The computer 201 may include one or more controllers 203, a processor 205, a network interface 209 for communication with a network 207, a memory 211, a display 215 (optional), and/or a user input device such as a keyboard 217. Alternatively, or in addition to the keyboard 217, a user input device may comprise one or more of various known input devices, such as a keypad, a computer mouse, a touchpad, a touch screen, a trackball, and/or a keyboard. The display 215 may present information to the user by way of a conventional liquid crystal display (LCD) or other visual display, and/or by way of a conventional audible device (e.g., a speaker) for playing out audible messages.

The processor 205 may comprise one or more microprocessors and/or one or more digital signal processors. The memory 211 may be coupled to the processor 205 and may comprise a read-only memory (ROM), a random-access memory (RAM), a programmable ROM (PROM), and/or an electrically erasable read-only memory (EEPROM). The memory 211 may include multiple memory locations for storing, among other things, an operating system, data and variables 241 for programs executed by the processor 205; computer programs for causing the processor to operate in connection with various functions such as collecting 243 metadata for a software artifact, interacting 245 with user or users to collect human-provided metadata to update artifact metadata, identifying 247 an existing project, any artifacts it is using, and version numbers for the artifacts and entering into project database, comparing 249 the software artifact metadata to the identified artifacts in the existing project to identify any issues of concern with artifacts in the existing project, and sending 251 warnings to associated project owners regarding any identified issues of concern; an artifact database 155; a project database 157; and a database 257 for other information and/or instructions used by the processor 205. The computer programs may be stored, for example, in ROM or PROM and may direct the processor 205 in controlling the operation of the computer 201. Each of these functions is considered in more detail herein.

The user may invoke functions accessible through the user input device such as the keyboard 217. The user input device may comprise one or more of various known input devices, such as a keyboard (217, illustrated) and/or a pointing device, such as a mouse; the keyboard 215 may be supplemented or replaced with a scanner, card reader, or other data input device; and the pointing device may be a mouse, touch pad control device, track ball device, or any other type of pointing device.

The display 215 is representative of a display that may present information to the user by way of a conventional liquid crystal display (LCD) or other visual display, and/or by way of a conventional audible device for playing out audible messages.

Responsive to manual signaling from the user input device represented by the keyboard 217, in accordance with instructions stored in memory 211, and/or automatically upon receipt of certain information via the network interface 209, the processor 205 may direct the execution of the stored programs.

The computer 201 can access a repository 221, 261 on which are stored one or more projects, e.g., Project P 223 and Project Q 263. In the project 223 are one or more artifacts and a Group ID, artifact ID, and version (collectively, "GAV"), here represented by one artifact 225 and its GAV 227. The project 223 also lists its contributors 229 and one or more licenses 231 that cover the artifacts in the project, and a project log 233 that includes other identifying information regarding the artifact 225. Although the projects 221, 261 are illustrated as accessed over a network, they may be configured to be remotely or locally accessible from the computer 201, over a wired or wireless connection. An example of the repository 221 is Maven, available at Apache.

The processor 205 may be programmed for collecting 243 metadata for a software artifact about project activity, security risk, or license information. For example, one or more artifacts 225 can be accessed on the repository; the information about the activity of the project 223 that the artifact is in can be collected from the project log 233 within the artifact's project information at the repository 221, 261; and information about the contributors, licenses, and the like for the project 223 which the artifact 225 is in can be collected from the repository. Techniques are known for accessing this information from a repository 221, 261.

The processor 205 may be programmed for interacting 245 with a user or users to collect human-provided metadata to update artifact metadata. A user interface may be provided to elicit textual descriptions of the artifact, to elicit the human's ranking of the artifact (e.g., numeric ranking, or up to five stars, or similar), or the like, as discussed further herein. Known techniques can be used to interact with a user to collect community rankings, although these techniques have not been used in connection with software artifacts 225. The human-provided metadata can be stored together with an indication of the author that provided the data. The updating can be achieved by altering the contents of the artifact database 253.

The processor 205 may be programmed for identifying 247 a change in any artifacts, and entering this information into the artifact database 155. This information can be obtained via a user interface (e.g., display 215 and keyboard 217) or by automatic perusal of the information stored in repositories 221, 261.

The processor 205 may be programmed for identifying 249 all projects that use the changed artifact from information in the artifact database 155. This identifying 249 can be achieved by examining the artifact profiles in the artifact database 155. Each artifact profile will include information regarding every project that has used the associated artifact. The artifact database 155 can be populated directly by a user, and/or can be inferred by scanning repositories 221, 261 to find out which project(s) 223, 263 use which artifact(s). Just as each project maintains information in its project profile regarding which artifacts it uses, each artifact likewise maintains information in its artifact profile regarding which projects use it. As a result, searching for project-artifact links can be done in either direction.

The processor 205 may be programmed for sending 251 warnings to associated project owners regarding any artifact changes of concern. This sending 251 of warnings can be achieved using user information stored in the project database 255. For example, the project database might include an email address to be used to provide such warnings to the user. The processor 205 may be programmed to periodically send an email message to that email address identifying a given project or artifact along with any issues of concern that have arisen regarding that project or artifact. In other embodiments, the processor 205 may be programmed to send a warning email message in real time, whenever an actionable change is made to an artifact.

Alternative methods of sending warning messages could also be used. For example, SMS messages, text messages, Tweets, or any suitable means of communicating an error message could be used. In some embodiments different means of warning could be employed for different types of warning. For example, a message regarding a low priority warning might be sent as an SMS message, while a medium priority warning might be sent as an email message, and a high priority message might be sent as a text message. Some warnings might even be sent via multiple channels. For example, a critical warning might be sent by SMS message, e-mail, and text message. Other permutations are, of course, possible.

The memory 211 may be programmed with the artifact database 155. Here, the artifact database 253 is illustrated as being local to the computer 201. Alternatively, the artifact database 253 can be provided remotely and/or distributed to two or more computers.

The memory 211 may be programmed with the project database 157. Here, the project database 255 is illustrated as being local to the computer 201. Alternatively, the project database 255 can be provided remotely and/or distributed to two or more computers.

As will be understood in this field, besides the functions discussed above, the memory 211 can include other miscellaneous information in a misc. database 247, along with the usual temporary storage and other instructions for other programs not considered herein.

The computer 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

It should be understood that FIG. 2 is described in connection with logical groupings of functions or resources. One or more of these logical groupings may be omitted from one or more embodiments, for example, the functionality of interacting with the user 245 to collect the human-provided metadata can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 3:
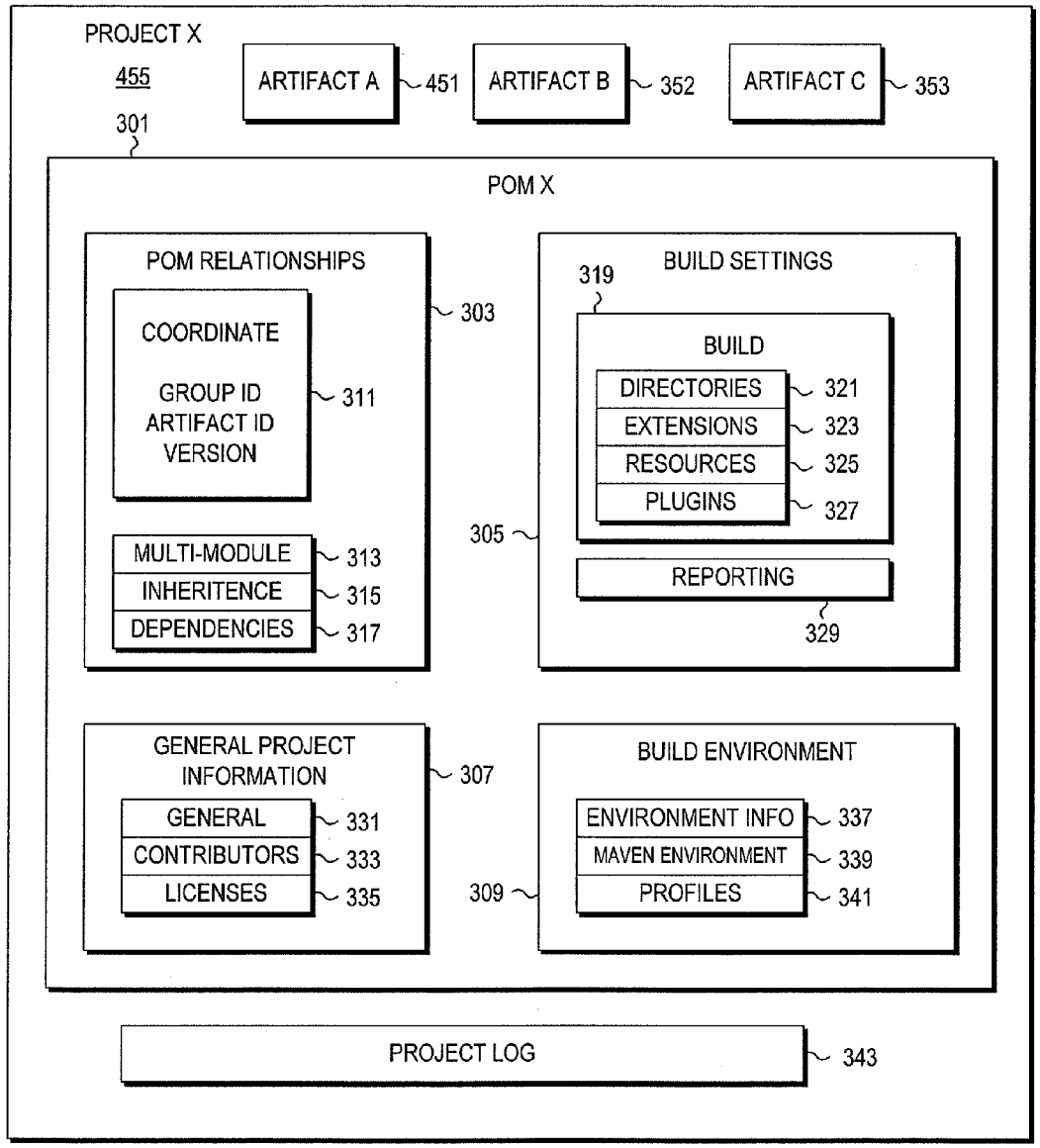
FIG. 3 is a block diagram illustrating a project object model.
Figure 3:
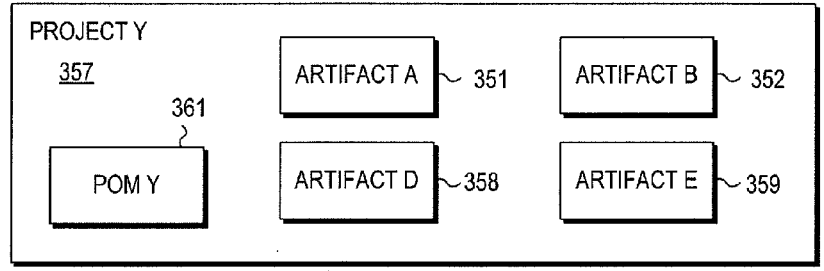

Referring now to FIG. 3, a block diagram illustrating a project object model will be discussed and described. The project, e.g., project X 355 includes one or more artifacts (here represented by Artifacts A and B 351, 353), the project log 343 for Project X, and metadata for the project X (here represented by POM X 301) that identifies project information such as contributors 333 and licenses 335. The illustrated example is a known Maven software (currently available at Apache) project object model, which provides a highly structured handling of projects and artifacts; a discussion of relevant portions is provided while other less relevant and known information is omitted. Maven is a build management tool that comprises a project object model ("POM"), a set of standards, a project lifecycle, a dependency management system, and logic for executing plugin goals at defined phases in a lifecycle.

A "Project Object Model" (POM), e.g., POM X 301 is a file provided for a project 355 that describes configures and customizes an application and is associated with one or more artifacts by being included in the same directory as one or more artifacts. In different build tools or project management tools, the POM 301 is a file included in a project, e.g., project X 355, which includes one or more artifacts (represented by artifact A and artifact B 351, 353); the POM can be a file with a pre-determined name: a Maven pom.xml file, a GNU Makefile, or an Ant build.xml file. The POM file is typically targeted to Java applications, building JAR artifacts, C# sources, or the like. A software artifact can be associated with a POM in alternative ways, for example, by including a link or identification of the associated POM.

The POM 301 can contain description data and configuration data: POM relationships 303, build setting 305, general project information 307, and build environment 309. These are discussed in more detail. General project information 307 includes general data 331 (project's name, the URL for a project, the sponsoring organization), a list of developers and contributors 333, and the license (or identifiers of licenses) for the project 355.

The build settings 305 for the project 355 customize the behavior of a build 319 by specifying location of directories 321, extensions 323, resources 325 and plugins 327. Also, the build settings 305 can specify reporting 329 to be used for the POM 301.

The build environment 309 comprises settings and profiles that can be activated when the software comprising the artifacts 351 is built for use in different environments. For example, during development the built software is deployed to a development server, whereas in production developers the built software is deployed to a production server. This example provides build environment information 337, Maven environment information 339, and profiles 341 to be used in different builds. Techniques for executing a build of software are known.

The POM relationships 303 include POM coordinates 311 that specify a group ID, an artifact ID, and a version number for the project 355 and for the POM 301. In the conventional Maven system, group ID, artifact ID and version (GAV) uniquely identify each artifact. The group ID is meant to identify the individual or organization that published the artifact. The artifact ID uniquely identifies an artifact for the Group, and in accordance with known techniques indicates what functionality the artifact is addressed to; artifact IDs need not be unique for different groups. The version is the temporal axis for how an artifact changes in accordance with known techniques, e.g., Version 1.0 is least mature, and Version 8.2.3 is more mature. Collectively, the group ID, artifact ID and version number are sometimes referred to herein as the "GAV", "Maven coordinate" or "GAV coordinate". The GAV uniquely identifies an artifact and allows its dependencies and relationship to other artifacts to be tracked. The use of the GAV disambiguates amongst artifacts across various domains of different groups.

Since each artifact 351, 353 is associated with the metadata, i.e., the information in the POM 301, the user can be provided with very targeted information. For example, a user can be informed that a particular artifact has not been updated for a long time or has security vulnerabilities to be fixed.

The POM as used in Maven is discussed in "MAVEN: The Complete Reference Guide", Edition 8 (2010). In a well-written POM, there is a block for "description", "project", "URL", "License", "Issue tracking", "author list" and the like. Known techniques can be used to construct a POM.

A project, e.g., project X 355 can have a parent, e.g., project Y 357. Project Y 357 is illustrated to include representative artifact C 359 and a POM Y 361. Values which are not specified in the POM in a child project can inherit values from the POM of a parent project, e.g., when general project information 307 is not specified in the POM X 301 of Project X 355, the project X 355 can inherit the general project information specified in the POM Y 361 of the parent project Y 357.

Also included in a project 355 is a project log 343. The project log 343 can perform known functions, such as recording source code check-in, who checked it in, why it was checked-in; recording source code check-out, who checked it out, why it was checked-out; recording update of an artifact, who updated it, from what sponsor, and why it was updated; recording a download of an artifact from the project, who downloaded it, and to where; tracking issues such as bugs and related fixes specifying artifacts which were fixed); and similar. Any and all of the foregoing are considered to be an activity. Typically the log includes a time stamp for each activity. This information may be divided between more than one file, which together can be considered to be a project log. Techniques for maintaining a project log are known in the industry.

A different project, e.g., project Y 357 includes other artifacts (here represented by Artifact C 359), the project log (not illustrated) for Project Y, and metadata for the project Y (here represented by POM Y 361) that identifies project information such as contributors and licenses.

A simple example of a POM follows:

```
<project>
<!-- model version is 4.0.0 for Maven 2.x POMs -->
<modelVersion>4.0.0</modelVersion>
<!-- project coordinates, i.e. a group of values which uniquely
identify this project -->
<groupId>com.mycompany.app</groupId>
<artifactId>my-app</artifactId>
<version>1.0</version>
<!-- library dependencies -->
<dependencies>
    <dependency>
        <!-- coordinates of the required library -->
        <groupId>junit</groupId>
        <artifactId>junit</artifactId>
        <version>3.8.1</version>
        <!-- this dependency is only used for running and
        compiling tests -->
      <scope>test</scope>
    </dependency>
</dependencies>
</project>
```

It is not necessary to use a POM structure according to Maven; alternative implementations of a project which include artifacts and a project log will be appreciated.

Figure 4:
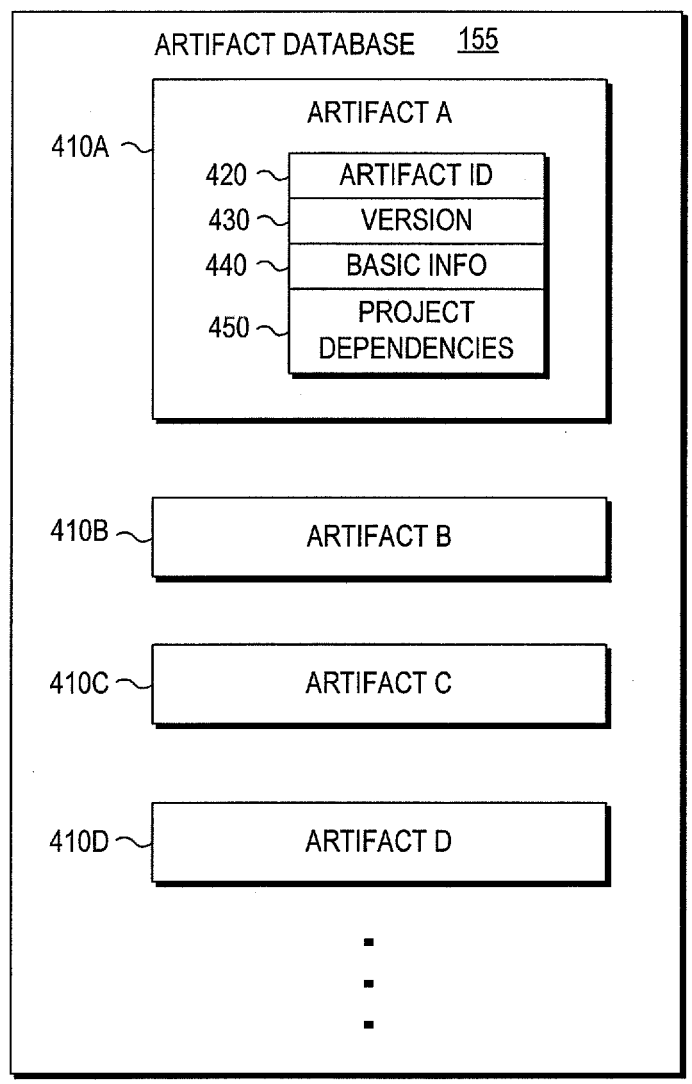
FIG. 4 is a block diagram illustrating an artifact database.

FIG. 4 is a block diagram illustrating an artifact database. As shown in FIG. 4, the artifact database contains a plurality of artifact profiles 410A, 410B, 410C, 410D, ... (collectively referred to as artifact profiles 410). Each artifact profile 410 includes the group ID 420 of the artifact, the artifact ID 430 of the artifact, and the version 440 of the artifact (collectively, the "GAV" of the artifact). Each artifact profile 410 also includes some basic information 450 regarding the artifact, and project dependencies 460 for the artifact.

The group ID 420, the artifact ID 430, and the version number 440 are the same as are described above with respect to the GAV 227. They identify the group the artifact belongs to, a unique identifier for the artifact, and a version number for the artifact, respectively.

The basic information 450 includes general information about the artifact. This could include a name, an author, comments about the artifact, etc.

The project dependencies 460 list all of the projects that this particular artifact. These projects will be identified by their unique project ID. Consider an example in which three projects (Project X, Project Y, and Project Z) make use of six artifacts (Artifact A, Artifact B, Artifact C, Artifact D, Artifact E, and Artifact F). Project X uses Artifact A, Artifact B, and Artifact C; Project Y uses Artifact A, Artifact B, Artifact D, and Artifact E; and Project Z uses Artifact A, Artifact C, Artifact D, Artifact E, and Artifact F. the following tables show the project dependencies 460 for each project

TABLE A

Example of Project Dependencies

| Artifact | Project IDs stored as Project Dependencies | | |
|---|---|---|---|
| Artifact A | Project X | Project Y | Project Z |
| Artifact B | Project X | Project Y | |
| Artifact C | Project X | Project Z | |
| Artifact D | Project Y | Project Z | |
| Artifact E | Project Y | Project Z | |
| Artifact F | Project Z | | |

Using this information, it is possible to identify every project that has used artifact. For example, by referring to the project dependencies 460 for Artifact C, it is possible to tell that Project X and Project Y use Artifact C.

The project dependencies element 460 for each artifact is populated as each project selects an artifact for use. Each time a project selects a given artifact to be used within the project, that project's project ID is entered into the project dependencies element 460 for the associated artifact. Furthermore, if the project removes the given artifact, then that project's project ID is removed from the project dependencies element 460 for associated artifact. Thus, an up-to-date list of project dependencies 460 is maintained.

The system can include a user interface for obtaining subjective information that people have about software artifacts which they are willing to share (referred to sometimes as "crowd-sourcing" or "artifact evaluations by humans"). The User Interface figures FIG. 5 and FIG. 6 disclose representative information that humans manually can provide about code. As will be appreciated, ratings provided by humans tend to be subjective.

Figure 5:
FIG. 5 is a single user interface to allow a user to review potentially changeable parameters of concern related to a given artifact.
Figure 6:
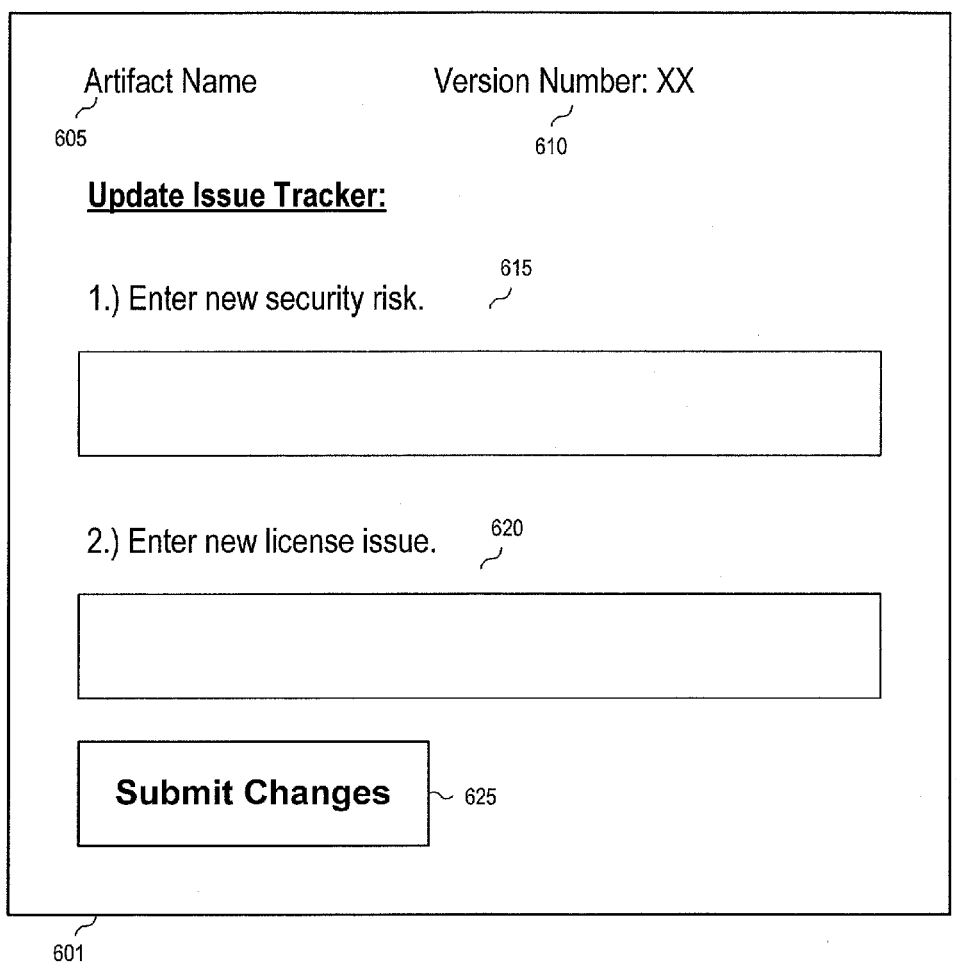
FIG. 6 is a simple user interface to allow a user to update issues of concern with respect to a given artifact.

FIG. 5 is a single User Interface to allow a user to review potentially changeable parameters of concern related to an artifact, and FIG. 6 is also a simple User Interface to allow a user to update issues of concern with respect to a given artifact. Each of these is discussed below in more detail.

Referring now to FIG. 5, a diagram identifying potentially changeable parameters of concern related to an artifact will be discussed and described. In FIG. 5, the user interface 501 interacts with a user to obtain an artifact name 505 (such as text title of artifact name, GAV, and/or the like) and a project name 510 (which can be the identifier or title of the project). The user interface 501 displays a review rating 515 of the artifact (e.g., a number of stars it's been given by community rating), a version number 520 of the artifact, a project community activity score 525 of the artifact, and a number of downloads 530 of the artifact. The user interface 501 can display a description 535 of the artifact previously input by the contributor of the artifact, as may be obtained from the artifact content, artifact metadata, or the artifact's project. The user interface 501 can also display known security risks 540 associated with the artifact and known license issues 545 associated with the artifact, each of which will have been previously entered by a user. In this interface, the user may be able to remove known security risks 540 or known license issues 545 as these issues are resolved. For example, if the current version of the artifact has corrected a security flaw, that flaw might be eliminated from the list of known security risks 540 associated with the artifact. Likewise, if a potentially infringed patent expires or is declared invalid, an associated entry on the list of known licensing issues 545 might be eliminated. However, the ability to delete these entries may be limited to administrators to maintain better data security.

Referring now to FIG. 6, a diagram illustrating a user interface to allow a user to update issues of concern with respect to a given artifact will be discussed and described. In this instance, the user becomes aware of issues that may relate to the desirability or safety of a given artifact and desires to share this knowledge. The user interface 601 interacts with a user to obtain the unique name 605 of an artifact and the version number 610 of that artifact about which the user's information is related. This version number may or may not be the current version number. For example, the most current version of an artifact may be version 4.3, while a user has identified a security flaw in version 3.0. Since some projects may still currently be using version 3.0, the identification of issues of concern for this older version is still relevant.

The user interface 601 can provide a security risk field 615 for the user to enter any new security risks identified with respect to the artifact and version identified in the user interface 601. The user interface 601 can provide a license issue field 620 for the user to enter any new security risks identified with respect to the artifact and version identified in the user interface 601. When the user has completed their update, a "submit changes" button 625 can be selected, causing the user's changes to be stored in the artifact database as human-provided meta-data for the artifact.

Figure 7:
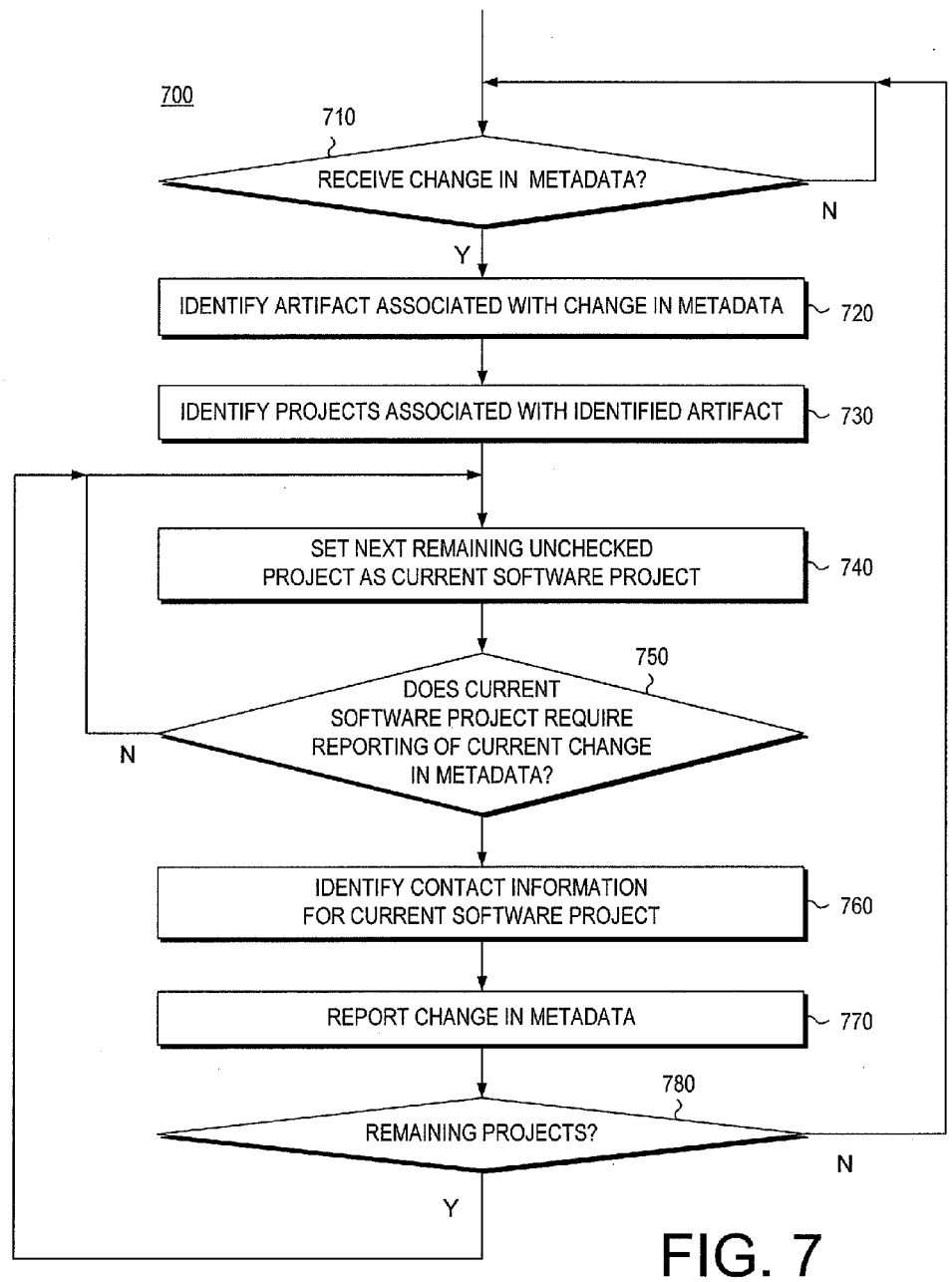
FIG. 7 is a flow chart illustrating a procedure to continually monitor metadata for actionable changes.

Referring now to FIG. 7, a flow chart illustrating a procedure 700 to continually monitor metadata for actionable changes will be discussed and described. The procedure can advantageously be implemented on, for example, a processor of a controller, described in connection with FIG. 2 or other apparatus appropriately arranged.

As shown in FIG. 7, the procedure 700 begins by determining if a change in metadata has been received. (710) If no change has been received, the procedure 700 continues to check for changes in metadata (710) until a change is received. A change is received whenever a piece of metadata is added, deleted, or altered in one of the metadata databases (e.g., community activity score 141, identified license issues 143, version information 145, identified security risks 147, level of software development 149, industry use information 151, . . . ).

In alternate embodiments, however, it is possible to limit ahead of time certain types of metadata change that will not be considered reportable or actionable changes. For example, it may be possible to monitor for only changes in one or two of: derived data, community/contributed data, or third-party data, rather than for all three. In this way, if it was considered valuable to monitor only changes in one type of metadata (e.g., third-party data), it would be possible to monitor for only those sorts of changes. Likewise, specific metadata types could be monitored (e.g., license issues, security risks, etc.)

Once a change in metadata is received, the process 700 identifies the artifact associated with that change in metadata. (720) As noted above, when changes to metadata have been entered, they will be referenced with respect to an associated artifact ID. Thus, it is possible to identify the artifact associated with a change in metadata by referencing the associated artifact ID.

Once the artifact associated with the change in metadata has been identified (720), the process 700 identifies all of the projects associated with that identified artifact by reference to the project dependencies 460 stored in the artifact profile 410 associated with the identified artifact and located in the artifact database 155. (730)

The process 700 then proceeds to go through each of the projects reporting the change in metadata, if it is a reportable change. It begins by determining whether there are any unchecked projects remaining (740) If a repository of artifacts is provided separate from the projects, it is possible that no projects currently use a given artifact, in which case the project dependencies element 460 will be empty and there will be no unchecked projects remaining at the start. If no unchecked projects are remaining, the process 700 returns to waiting for receipt of a change in metadata (710).

If, however, there are unchecked projects remaining, the process 700 sets the next remaining unchecked project as a current software project. (750) At the start, this will be the first project listed in the list of project dependencies 460.

The process 700 then determines whether the current software project requires reporting of the current change in metadata. (760) This may be accomplished by looking in the an associated project profile in the project database 157, which includes information regarding what types of metadata changes are actionable for each project. In different embodiments, this process can be inclusive or exclusive. In other words, the project profile can indicate which metadata changes to report, and excludes all others, or the project profile can indicate which metadata changes not to report, and include all others.

More complicated parameters can also be provided. For example, the project profile could indicate certain metadata changes to report prior to project release, and other metadata changes to report after project release. This is because certain metadata changes may become irrelevant after project release, while others may remain relevant. Other criteria and trigger points may also be used.

If the process 700 identifies the current software project as not requiring the reporting of the current change in metadata (760), it will then determine whether there are any unchecked projects remaining (740) and proceed accordingly. This will be repeated until all of the projects associated with the identified artifact in the artifact profile 410 are checked.

If the process 700 identifies the current software project as requiring the reporting of the current change in metadata (760), then it will identify the contact information for the current software project. (770) This can be accomplished by referencing the relevant project profile in the project database 157, which includes such contact information.

In some embodiments, this may be a single piece of contact information (e.g., an email address, a webpage, an SMS feed, a telephone number, etc.). In other embodiments, however, the project profile could provide different contact methods to use for different types of metadata changes. For example low-profile changes might be reported only by an SMS feed; medium profile changes might be reported via email; and high-profile changes might be reported by text message. Some changes might even be reported by multiple methods (e.g., by email and by text message).

Once the contact information has been obtained (770), the process 700 reports the change in metadata using the appropriate reporting method. (780) Processing then returns to operation 740 to determine whether any unchecked projects remaining.

Figure 8:
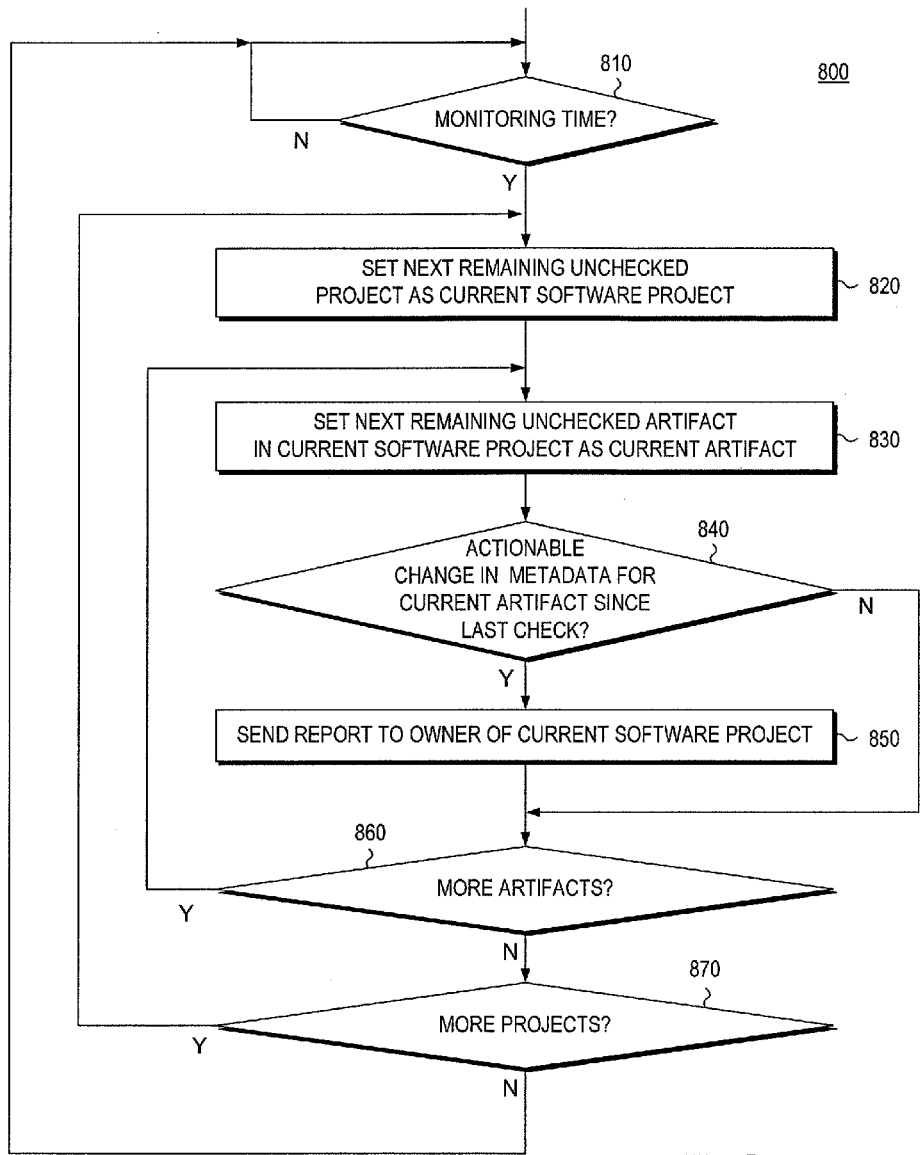
FIG. 8 is a flow chart illustrating a procedure to periodically monitor metadata for actionable changes.

Referring now to FIG. 8, a flow chart illustrating a procedure 800 to periodically monitor for changes in metadata will be discussed and described. The procedure 800 can advantageously be implemented on, for example, a processor of a controller, described in connection with FIG. 2 or other apparatus appropriately arranged.

This operation may be useful in situations in which the metadata changes frequently. For example, if the metadata may change several times a day, a user may wish to only receive a daily digest of actionable metadata changes for artifacts that it uses in one or more of its projects.

As shown in FIG. 8, the procedure 800 begins by determining whether it is the appropriate monitoring time. (810) If it is not the appropriate monitoring time then the process recursively loops until it reaches the appropriate monitoring time.

If it is the appropriate monitoring time (810), then the procedure 800 determines whether there are any remaining unchecked artifacts. (820) This can be performed by reviewing all of the artifacts in the artifact database 155. Alternatively, a separate list of artifacts to be monitored can be prepared and stored in memory. In such a case only this list of artifacts will be continually monitored.

If there are no remaining unchecked artifacts (820), then processing returns to waiting for the next monitoring time (810). If, however, there are remaining unchecked artifacts, then processing sets the next remaining unchecked artifact in the artifact database as a current artifact. (830)

The process then determines whether there has been a change in metadata for the current artifact since the last check was made. (840) For such an operation to be possible, some indication of the timing of a change in the metadata associated with an artifact should be maintained. For example, each change in metadata could be date/time stamped. Alternatively, new changes could be placed in a first portion of the artifact profile prior to being checked, and then could be moved to a second portion of the artifact profile after they were checked. This would allow the process to simply check for all changes located in the first portion of the artifact profile.

If there have been no changes in the metadata for the current artifact since the last check (840), then processing determines whether there are any remaining unchecked artifacts (820). If, however, there have been changes in the metadata for the current artifact since the last check, processing will identify any projects associated with the identified artifact and will check each of those projects to determine whether the change in metadata was actionable, sending a report where necessary. This process is similar to that shown by elements 730-780 in FIG. 7, except that when there are no unchecked projects remaining (740), processing returns to element 820 to determine whether there are any remaining unchecked artifacts. A description of the operation of these elements will not be repeated.

By employing these operations, a software user that makes use of the monitored artifacts can be given advanced warning of potentially troublesome issues related to the artifacts, or the existence of updated versions of the artifacts. Furthermore, this is likely done earlier than if the user had to perform the monitoring himself. This can be helpful since the issues of concern may be identified before they become critical, allowing the user the time to address the issues. For example, if one issue of concern is a newly identified security flaw, the software user may be able to deploy a patch before someone makes use of the flaw. In addition, if the project is not completed or not released, then it may even be possible to select a different artifact or a newer version of the artifact, which does not contain the identified flaw.

The detailed descriptions which appear above may be presented in terms of program procedures executed on a computer or network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), NetBIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer-implemented method for monitoring a software project that includes one or more software artifacts for a user, comprising:

collecting and storing artifact information related to one or more software artifacts, the artifact information including: an artifact identifier for each of the one or more artifacts, project identifiers for any of one or more software projects that use each of the one or more artifacts, information about the temporal version for the one or more artifacts;

collecting and storing project information related to the one or more software projects that use the one or more software artifacts, the project information including: a project identifier for each of the one or more projects, and contact information for a user of the software project;

collecting, from a software repository by communication over the transceiver, metadata associated with the one or more software artifacts, the metadata for each of the one or more software artifacts including: information identifying the respective artifact, information about security risks associated with the respective artifact, information about a license associated with the respective artifact, or information indicative of a level of use or user rating of the respective artifact;

periodically or continually monitoring the metadata to determine whether there has been any actionable change in the metadata associated with the one or more software artifacts;

notifying the user of any software project that uses a software artifact for which there has been an actionable change about the actionable change, the notifying operation being performed via the transceiver using the contact information; and wherein the project information includes evaluation criteria for each of the one or more software artifacts used by each of the one or more projects, the project evaluation criteria identifying what makes a change in the metadata actionable, wherein the metadata is continually monitored for actionable changes, and wherein the continual monitoring includes detecting a change in the metadata associated with the one or more software artifacts, and determining whether the change in the metadata is actionable for a respective software project based on the evaluation criteria in a respective set of project information.

2. The method of claim 1, wherein the information identifying the respective artifact includes:
a group identifier uniquely identifying a publisher of the respective artifact, and
a version number uniquely indicating a temporal version of the respective artifact,
wherein the artifact identifier uniquely identifies the respective artifact within the publisher.

3. The method of claim 1,
wherein the information regarding a level of use or user rating of the respective artifact includes at least one of:
user-provided ranking information specific to the respective artifact obtained from a community of users to which the user belongs, or
an indication of a number of users with the community who are also using the respective artifact, and
wherein the community of users to which the user belongs is determined by a profile of the user or the user project to which the user belongs as indicated by the profile of the user.

4. The method of claim 1, further comprising
interacting with a user to collect human-provided artifact metadata including the information indicative of a level of use or user rating of the respective artifact community.

5. The method of claim 1, wherein the artifact is stored in the software repository according to the Open Source Definition, the software repository being an open source repository.

6. The method of claim 1,
wherein the metadata is monitored for an actionable change every time any piece of metadata is changed.

7. A computer system, comprising:
a transceiver operable to transmit and receive communications over at least a portion of a network; and
a processor cooperatively operable with the transceiver, and configured to facilitate:
collecting and storing artifact information related to one or more software artifacts, the artifact information including: an artifact identifier for each of the one or more artifacts, project identifiers for any of one or more software projects that use each of the one or more artifacts, and information about the temporal version for the one or more artifacts;
collecting and storing project information related to the one or more software projects that use the one or more software artifacts, the project information including: a project identifier for each of the one or more projects, and contact information for a user of the software project;
collecting, from a software repository by communication over the transceiver,
metadata associated with the one or more software artifacts, the metadata for each of the one or more software artifacts including: information identifying the respective artifact, information about security risks associated with the respective artifact, information about a license associated with the respective artifact, or information indicative of a level of use or user rating of the respective artifact;
periodically or continually monitoring the metadata to determine whether there has been any actionable change in the metadata associated with the one or more software artifacts;
notifying the user of any software project that uses a software artifact for which there has been an actionable change about the actionable change, the notifying operation being performed via the transceiver using the contact information; and
wherein the project information includes evaluation criteria for each of the one or more software artifacts used by the project identifier for each of the one or more projects, the project evaluation criteria identifying what makes a change in the metadata actionable,
wherein the metadata is continually monitored for actionable changes, and
wherein the continual monitoring includes detecting a change in the metadata associated with the one or more software artifacts, and
determining whether the change in the metadata is actionable for a respective software project based on the evaluation criteria in a respective set of project information.

8. The computer system of claim 7,
wherein the information relating to the one or more respective artifacts further includes:
a group identifier uniquely identifying a publisher of the respective artifact, and
a version number uniquely indicating a temporal version of the respective artifact, and
wherein the artifact identifier uniquely identifies the respective artifact within the publisher.

9. The computer system of claim 7,
wherein the information relating to the one or more respective artifacts further includes:
a coordinate system identifier that identifies a coordinate system used, and
information identifying the respective artifact using the coordinate system.

10. The computer system of claim 9,
wherein the coordinate system is one of: a Maven coordinate system, a P2 coordinate system, an Open Source Gateway initiative (OSGi) coordinate system, a RubyGems coordinate system, or a NuGet coordinate system.

11. The computer system of claim 7,
wherein the information indicative of a level of use or user rating of the respective artifact includes at least one of:
user-provided ranking information specific to the respective artifact obtained from a community of users to which the user belongs, or
an indication of a number of users with the community who are also using the respective artifact, and
wherein the community of users to which the user belongs is determined by a profile of the user or the user project to which the user belongs as indicated by the profile of the user.

12. The computer system of claim 9, wherein the processor is further configured to facilitate:
interacting with a user to collect human-provided metadata including the information indicative of a level of use or user rating of the respective artifact community.

13. The computer system of claim 7, wherein the artifact is stored in the software repository according to the Open Source Definition, the software repository being an open source repository.

14. The computer system of claim 7,
wherein the processor further comprises a calendar database configured to determine when to periodically monitor the metadata to determine whether there has been any actionable change in the metadata associated with the one or more software artifacts.

15. The computer system of claim 7,
wherein the metadata is monitored for an actionable change every time any piece of metadata is changed.

16. A non-transitory computer-readable medium comprising instructions for execution by a computer, the instructions including a computer-implemented method for providing a method for monitoring a software project, the instructions for implementing:
collecting and storing artifact information related to one or more software artifacts, the artifact information including: an artifact identifier for each of the one or more artifacts, project identifiers for any of one or more software projects that use each of the one or more artifacts, information about the temporal version for the one or more artifacts;
collecting and storing project information related to the one or more software projects that use the one or more software artifacts, the project information including: a project identifier for each of the one or more projects, and contact information for a user of the software project;
collecting, from a software repository by communication over the transceiver, metadata associated with the one or more software artifacts, the metadata for each of the one or more software artifacts including: information identifying the respective artifact, information about security risks associated with the respective artifact, information about a license associated with the respective artifact, or information indicative of a level of use or user rating of the respective artifact;
periodically or continually monitoring the metadata to determine whether there has been any actionable change in the metadata associated with the one or more software artifacts;
notifying the user of any software project that uses a software artifact for which there has been an actionable change about the actionable change, the notifying operation being performed via the transceiver using the contact information; and
wherein the project information includes a evaluation criteria for each of the one or more software artifacts used by the project identifier for the each of the one or more projects, and contact information for a user of the software project, the project evaluation criteria identifying what makes a change in the metadata actionable,
wherein the metadata is continually monitored for actionable changes, and
wherein the instructions are for further implementing:
detecting a change in the metadata associated with the one or more software artifacts, and
determining whether the change in the metadata is actionable for a respective software project based on the evaluation criteria in a respective set of project information.

17. The non-transitory computer-readable medium of claim 16, wherein the information identifying the respective artifact includes:
a group identifier uniquely identifying a publisher of the respective artifact,
a version number uniquely indicating a temporal version of the respective artifact, and
an artifact identifier uniquely identifying the respective artifact within the publisher.

18. The non-transitory computer-readable medium of claim 16,
wherein the information regarding a level of use or user rating of the respective artifact includes at least one of:
user-provided ranking information specific to the respective artifact obtained from a community of users to which the user belongs, or
an indication of a number of users with the community who are also using the respective artifact, and
wherein the community of users to which the user belongs is determined by a profile of the user or the user project to which the user belongs as indicated by the profile of the user.

19. The non-transitory computer-readable medium of claim 16, wherein the instructions are for further implementing:
interacting with a user to collect human-provided artifact metadata including the information indicative of a level of use or user rating of the respective artifact community.

20. The non-transitory computer-readable medium of claim 16, wherein the artifact is stored in the software repository according to the Open Source Definition, the software repository being an open source repository.

21. The non-transitory computer-readable medium of claim 16, wherein the instructions implement monitoring metadata for an actionable change every time any piece of metadata is changed.

* * * * *